(12) United States Patent
Thompson et al.

(10) Patent No.: US 12,281,733 B2
(45) Date of Patent: Apr. 22, 2025

(54) GIMBAL JOINTS FOR BLEED AIR SYSTEMS

(71) Applicant: Senior IP GmbH

(72) Inventors: Christopher Thompson, Newhall, CA (US); Matthew Parker, Los Angeles, CA (US); Eric Possert, Pacoima, CA (US)

(73) Assignee: Senior IP GmbH, Schaffhausen (CH)

( * ) Notice: Subject to any disclaimer, the term of this patent is extended or adjusted under 35 U.S.C. 154(b) by 174 days.

(21) Appl. No.: 17/518,296

(22) Filed: Nov. 3, 2021

(65) Prior Publication Data
US 2022/0099225 A1 Mar. 31, 2022

Related U.S. Application Data

(63) Continuation-in-part of application No. 16/442,541, filed on Jun. 16, 2019, now Pat. No. 11,530,765.

(51) Int. Cl.
F16L 27/08 (2006.01)
F16L 27/00 (2006.01)
(Continued)

(52) U.S. Cl.
CPC ............ F16L 27/0857 (2013.01); F16L 27/00 (2013.01); F16L 27/02 (2013.01); F16L 27/08 (2013.01);
(Continued)

(58) Field of Classification Search
CPC ......... F16L 51/025; F16L 27/02; F16L 27/04; F16L 27/111
See application file for complete search history.

(56) References Cited

U.S. PATENT DOCUMENTS 2,998,270 A 8/1961 Watkins
3,232,646 A 2/1966 Henry
(Continued)

FOREIGN PATENT DOCUMENTS

JP S57-059290 4/1957
JP 2018-115764 A 7/2018

OTHER PUBLICATIONS

U.S. Patent and Trademark Office, Non-Final Office Action issued in U.S. Appl. No. 16/442,541, dated Feb. 7, 2022, 19 pgs.
(Continued)

Primary Examiner — Zachary T Dragicevich
Assistant Examiner — Alexander T Rufrano
(74) Attorney, Agent, or Firm — Greenberg Traurig, LLP

(57) ABSTRACT

A sealed joint assembly for transmitting high temperature and high pressure fluid between adjoining ducts in, for example, an aircraft bleed air system, includes a gimbal ring and two annular clevises. Each clevis includes a pair of axially-extending lobes that each includes a bore hole extending therethrough. The bore holes of the clevis lobes may each align with a respective bore hole formed within the gimbal ring, through which a pin may be inserted to couple the clevises to the gimbal ring. The clevises and gimbal ring may be formed using additive manufacturing. The gimbal ring may include a strut or truss network, and may be comprised of an inner gimbal ring and an outer gimbal ring.

31 Claims, 27 Drawing Sheets
(10 of 27 Drawing Sheet(s) Filed in Color)

(51) Int. Cl.
    *F16L 27/02*     (2006.01)
    *F16L 27/11*     (2006.01)
    *F16L 51/02*     (2006.01)

(52) U.S. Cl.
    CPC .............. *F16L 27/11* (2013.01); *F16L 51/02* (2013.01); *F16L 51/025* (2013.01)

(56) References Cited

U.S. PATENT DOCUMENTS

| | | | | |
|---|---|---|---|---|
| 4,480,857 A | * | 11/1984 | Graves | F16L 27/0857 285/226 |
| 4,643,463 A | * | 2/1987 | Halling | F16L 27/0857 285/226 |
| 4,645,244 A | * | 2/1987 | Curtis | F16L 27/0857 285/226 |
| 4,652,025 A | * | 3/1987 | Conroy, Sr. | F16L 27/0857 285/226 |
| 7,040,666 B2 | | 5/2006 | Christianson et al. | |
| 9,163,762 B2 | * | 10/2015 | French | F16L 27/0857 |
| 10,428,986 B2 | | 10/2019 | Yeandel | |
| 10,837,405 B2 | * | 11/2020 | Hawksworth | F16M 13/02 |
| 11,085,565 B2 | * | 8/2021 | Tajiri | F16L 27/02 |
| 2016/0312923 A1 | | 10/2016 | Shi | |
| 2018/0038530 A1 | | 2/2018 | Yeandel | |
| 2018/0202589 A1 | | 7/2018 | Tajiri et al. | |
| 2018/0202590 A1 | | 7/2018 | Tajiri et al. | |
| 2019/0086009 A1 | * | 3/2019 | Thorogood | F16D 3/36 |
| 2021/0180733 A1 | * | 6/2021 | Gupta | F16L 27/107 |
| 2021/0190246 A1 | * | 6/2021 | Corll | F16L 27/02 |

OTHER PUBLICATIONS

European Patent Office, International Search Report and Written Opinion issued in PCT/EP2020/065181, dated Sep. 23, 2020, 10 pgs.
Korean Intellectual Property Office, Preliminary Rejection issued in KP Appl. No. 10-2021-7041110, dated Feb. 24, 2023, 10 pgs.
Korean Intellectual Property Office, Preliminary Rejection issued in KP Appl. No. 10-2021-7041110, dated Feb. 24, 2023, 10 pgs.—Translation.
EPO, Office Action issued in 20730591.3, dated Nov. 17, 2022, 4 pgs.
JPO, Office Action issued in JP Appl. No. 2021-574325, dated Feb. 21, 2023, 3 pgs.
JPO, Office Action issued in JP Appl. No. 2021-574325, dated Feb. 21, 2023, 2 pgs.—Translation.
Office Action from Canadian patent application No. 3,138,787, dated Feb. 22, 2024, 3 pp.
Office Action from KR application No. 10-2021-7041110, issued Nov. 9, 2023, 5 pp.

* cited by examiner

GIMBAL JOINTS FOR BLEED AIR SYSTEMS

RELATED APPLICATION DATA

This application is a Continuation-in-Part of U.S. patent application Ser. No. 16/442,541 entitled "GIMBAL JOINTS FOR BLEED AIR SYSTEMS," filed Jun. 16, 2019, the contents of which are incorporated herein in their entirety and for all purposes.

FIELD OF THE INVENTION

The present invention generally relates to gimbal joints for ducting, and more specifically to sealed gimbal joint assemblies for flexibly connecting ducts that transmit high temperature and high pressure fluids, such as bleed air ducting systems in aircraft or spacecraft, and more particularly to reduced-weight gimbal joint designs that maintain sufficient structural integrity and provide suitable flexibility for high performance aerospace applications.

BACKGROUND OF THE INVENTION

Ducting systems are commonly used to convey high pressure, high temperature fluids across sections of a system. Ducting systems are typically constructed from a series of conduits that are fluidly coupled to each other by way of sealed joints, such as within an aircraft or a spacecraft. Depending on the particular system, the sealed joints may provide for some amount of angular, axial, and/or lateral flexibility, to enable the joints to turn and/or to withstand vibration, turbulence, stresses, as well as significant fluctuations in temperature and pressure.

Combustion turbine engines operate by compressing air through one or more compressor stages, some or all of which is mixed with gas and ignited at a combustor stage. Certain turbine engines—such as turbofan engines, jet engines, and rocket engines, among others—may compress more air than is necessary for combustion. Some of this excess compressed air may be conveyed through a bleed air duct system of an aircraft or spacecraft for non-thrust purposes, such as pressurizing and/or heating a cabin, engine and airframe anti-icing, and driving pneumatic actuators, among other possible uses.

Typically, compressed air in bleed air duct systems exits the compressor stage of a turbine engine at temperatures as high as 1300° Fahrenheit, and at pressures as high as 1,000 PSIG, although the temperatures and pressures vary during operation. Fluctuations in temperature and pressure can produce stresses in the bleed air ducts, which if left unmitigated can damage the ducting. It is therefore desirable to provide sealed ducting joints that permit some degree of expansion, rotation, translation and/or angling to accommodate the stresses caused by fluctuations in temperature and pressure, as well as by the stresses, forces, vibrations and turbulence of flight itself. In addition, bleed air ducting systems are typically fitted into irregularly shaped areas of an aircraft or spacecraft. Thus, it is also desirable to provide flexible joints capable of angling ducts relative to each other to fit within a particular confined space.

One known flexible joint assembly for bleed air systems is a ball joint, which includes a pair of complementary spherical shells to enable one duct to be angled relative to its adjoining duct. A bellows may be sealed to both ends of the ball joint to provide a fluid-tight gas passage extending through the center of the ball joint. While ball joints can enable high levels of angular deflection, they require a substantial amount of material in order to provide a sufficient amount of structural integrity, together with a substantial amount of friction and resistance.

Gimbal joints have also been used in bleed air systems to provide adequate flexibility between adjoining ducts. Gimbal joints are typically limited to rotation in one or two degrees of freedom, with the axes of rotation extending through clevis lugs that form a revolute joint, together with a central gimbal ring. A common gimbal joint assembly includes a pair of clevises that are rigidly coupled to a gimbal ring, with four pins or lugs extending through aligned holes in the clevises and gimbal ring, at 90° intervals.

Existing gimbal joint designs may provide for levels of flexibility and strength that meet or exceed a particular set of requirements. However, existing gimbal joints are not typically "optimized"—to minimize weight and/or the amount of metal used to construct the components.

Accordingly, there is an opportunity to reduce the weight of an aircraft or spacecraft by optimizing the geometry and/or topology of the gimbal joints used in its bleed air ducting system. It is therefore an object of the present invention to provide reduced-weight gimbal joint assemblies that maintain sufficient structural integrity for high temperature and high pressure applications.

These and other objectives and advantages of the present invention will become apparent from the following detailed written description, drawing figures, and claims.

SUMMARY OF THE INVENTION

To accomplish the aforementioned objectives, embodiments of the present invention provide for gimbal joint assemblies that improve upon existing gimbal joints by adding, relocating and/or removing or omitting extraneous material from the gimbal joint assembly in a manner that substantially maintains compliance with one or more structural requirements. Unlike traditional gimbal joint components, which are constructed from substantially solid annular components, gimbal joints fabricated according to the present disclosure possess more complex topologies that omit structurally-dispensable material. In some embodiments, the particular dimensions of a gimbal joint may be geometrically-optimized and/or topologically-optimized, given a set of requirements and constraints, to generate components that minimize or reduce the weight of the gimbal joint assembly, while simultaneously reducing friction (and wear) between rotating or translational contact points. An optimization algorithm may optimize the material layout for a gimbal joint component within a given space to withstand a particular range of loads (e.g., temperatures, pressures, bend angles, etc.), and to factor in any boundary conditions and other constraints (e.g., limitations of a particular manufacturing method, such as the resolution of an additive manufacturing machine) that may affect the efficient design and enhanced operation of the gimbal joint. Aspects of these engineering requirements and design constraints may be parameterized, and used to generate, optimize, or otherwise refine the geometry and/or topology of one or more gimbal joint components.

An example gimbal joint assembly includes two opposing annular clevises, a central gimbal ring positioned between the clevises, and a bellows extending between the clevises. Each clevis includes a shroud for adjoining the clevis to a respective pipe or duct, along with a pair of lobes that extend over and above a portion of the central gimbal ring, at successively alternating 90° locations. The gimbal ring may include, among other features, struts or trusses that form a "shear web" circumferentially extending about the gimbal ring. The shear web may serve to impart flexibility to the gimbal ring in a manner that maintains an adequate resistance to shear forces. The gimbal ring may include a set of bore holes that are circumferentially spaced about the circumference of the ring that each align with a respective bore hole of a clevis lobe. Pins are positioned through the aligned bore holes to couple the clevises to the gimbal ring.

In an example implementation, the lobes on each clevis are positioned approximately 180° apart from each other, and the bore holes on the gimbal ring are spaced apart by approximately 90° from each other. In this arrangement, the connection between each clevis and the gimbal ring forms a revolute joint, permitting some amount of angular deflection about an axis extending through the pair of clevis lobe bore holes. The clevises may be rotated by about 90° with respect to each other, such that the axis of rotation for one clevis is orthogonal to the axis of rotation of the other clevis. In this manner, the gimbal joint may permit angular deflection between two adjoining ducts in two degrees of freedom.

In some embodiments, components of the gimbal joint assembly may be manufactured using additive manufacturing processes, such as direct metal laser sintering (DMLS). Some additive manufacturing techniques are capable of producing intricate and precise designs that would be difficult or impossible to produce using other manufacturing techniques. Embodiments of the present disclosure leverage the improved precision afforded by additive manufacturing to produce designs that are robust, and which may use fewer components compared to traditional gimbal joints by integrating multiple features into a single element. For instance, some implementations of the present disclosure include clevises that include an axially- and circumferentially-extending narrow slot adjacent to their proximal ends (the axial ends of the clevises that face each other when assembled). Each slot is adapted to receive an end of a bellows, which may be welded, brazed, or otherwise sealedly joined to the clevis. While previous gimbal joint designs have sandwiched bellows ends between two or more separate components, some embodiments of the present disclosure integrate bellows slots into the clevis itself, thereby reducing the number of steps to assemble the gimbal joint. Furthermore, although reference is made throughout to additive manufacturing, the disclosure should not limited to components formed via additive manufacturing. As such, the disclosure should be read to apply to components formed via machining (i.e., subtractive manufacturing), casting, etc.

Other aspects of a gimbal joint's structure and design may be varied to account for space constraints, material properties and, anticipated mechanical and/or thermal stresses, among other possible factors. For instance, a particular additive manufacturing process may have one or more limitations (e.g., finite resolution, types of shapes or curves that can be produced, etc.) when working with a particular type of material (e.g., titanium). A variety of factors may be considered and/or serve as parameters that constrain, inform, or otherwise affect the geometry and/or topology of a particular gimbal joint design.

While various example gimbal joint designs are described above, and in greater detail below, and are shown in the drawings, it should be understood that the particular dimensions, shapes, and features used in a specific implementation may depend on the design constraints and engineering requirements of that specific implementation. The specific examples shown and described herein are provided for explanatory purposes. Different geometries and topologies not explicitly shown and described herein may nonetheless be used to achieve the objectives of the present disclosure, based on optimization techniques described herein. The present application is not limited to the explicitly provided examples.

According to a first aspect of the present invention, there is provided a sealed joint assembly for transmitting high temperature and high pressure fluid between adjoining ducts. The joint assembly includes a gimbal ring comprising at least one pair of overlapping struts extending circumferentially around a portion of the gimbal ring, along with a set of bores circumferentially spaced about the gimbal ring. The joint assembly also includes a first clevis having an annular shroud adapted for positioning concentrically within a portion of the gimbal ring, and at least two lobes integrally formed with the shroud. Each lobe extends radially outward and axially over a portion of the gimbal ring. In addition, each lobe has a bore extending therethrough for alignment with a respective bore of the gimbal ring. The first clevis is adapted to sealedly couple with a duct conveying high temperature and high pressure fluid, such as a duct of a bleed air system. The joint assembly also includes a second clevis having an annular shroud adapted for positioning concentrically within a portion of the gimbal ring, and at least two lobes integrally formed with the shroud. Each lobe extends radially outward and axially over a portion of the gimbal ring, and each has a bore extending therethrough for alignment with a respective bore of the gimbal ring. The second clevis adapted to sealedly couple with a duct conveying high temperature and high pressure fluid, such as a duct of a bleed air system. The joint assembly may also include a bellows having a first end and a second end, with the first end being sealedly coupled to the first clevis and the second end being sealedly coupled to the second clevis.

In embodiments according to the first aspect, at least one lobe of said first clevis includes one or more apertures that form a shear web.

In embodiments according to the first aspect, the bellows further includes a plurality of convolutions positioned between said first and second ends.

In embodiments according to the first aspect, the gimbal ring has a first end and a second end axially opposite to the first end. The gimbal ring also includes a first region and a second region between which the pair of overlapping struts circumferentially extends. The pair of overlapping struts includes a first strut and a second strut. The first strut extends from the second side of the first region to the first side of the second region, and the second strut extends from the first side of the second region to the second side of the first region. The first and second struts are not connected at the location where the first and second struts overlap. In these embodiments, the first strut may be integrally formed with the first region and the second region, and the second strut may be integrally formed with the first region and the second region.

In embodiments according to the first aspect, the joint assembly also includes a first pair of at least two pins, with each pin extending through a bore of the gimbal ring and a respective bore of the first clevis. Likewise, the joint assembly according to these embodiments further includes a second pair of at least two pins, with each pin extending through a bore of the gimbal ring and a respective bore of the second clevis.

In embodiments according to the first aspect, the gimbal ring, the first clevis, and/or the second clevis is constructed using one or more additive manufacturing processes.

In embodiments according to the first aspect, the gimbal ring, the first clevis, and/or the second clevis has an optimized geometry that is computationally generated, optimized, or refined based on one or more dimensional constraints.

In embodiments according to the first aspect, the gimbal ring, the first clevis, and/or the second clevis has an optimized topology that may be generated, optimized, or refined based on one or more load specifications, either computationally or through engineering judgment.

In embodiments according to the first aspect, the annular shroud of the first clevis includes a distal section and a proximal section integrally formed with the distal section. A portion of the distal section concentrically overlaps a portion of the proximal section to form an axially-extending slot that is adapted to receive the first end of the bellows. The annular shroud of the first clevis may include a plurality of apertures that extend axially between an inner surface of the annular shroud and the axially-extending slot. The apertures may be adapted to convey braze flux to the first end of the bellows that, after brazing, causes the bellows to form a fluid-tight seal with said first clevis.

According to a second aspect of the present invention, there is provided a sealed joint assembly for transmitting high temperature and high pressure fluid between adjoining ducts. The joint assembly includes a gimbal ring having a set of integrally formed underhanging portions that each extend radially inward from an inner surface of the gimbal ring, and extend axially toward an axial center of said gimbal ring. Each underhanging portion defines a pocket region. The gimbal ring also includes a set of bores circumferentially spaced about the gimbal ring. In addition, each underhanging portion includes a bore in substantial alignment with a bore of the set of bores of the gimbal ring. The joint assembly also includes a first clevis having an annular shroud adapted for positioning concentrically within a portion of the gimbal ring, and at least two lobes integrally formed with the shroud. Each lobe extends radially outward and axially into a respective pocket region of the gimbal ring. Each lobe also includes a bore that substantially aligns with a respective bore of the gimbal ring and with a respective bore of the underhanging portion defining the pocket region into which the lobe is disposed. The joint assembly further includes a second clevis having an annular shroud adapted for positioning concentrically within a portion of the gimbal ring, and at least two lobes integrally formed with the shroud. Each lobe extends radially outward and axially into a respective pocket region of said gimbal ring, and includes a bore that substantially aligns with a respective bore of the gimbal ring and with a respective bore of the underhanging portion defining the pocket region into which the lobe is disposed. Additionally, the joint assembly includes a set of pins, with each pin extending through aligned bores of the gimbal ring, the first clevis, and a respective underhanging portion of the gimbal ring in a double-shear arrangement.

According to a third aspect of the present invention, there is provided a method of manufacturing a sealed gimbal joint for transmitting high temperature and high pressure fluid between adjoining ducts. The method involves forming, by additive manufacturing, a gimbal ring that includes at least one pair of overlapping struts extending circumferentially around a portion of the gimbal ring. The gimbal ring includes a set of bores circumferentially spaced about the gimbal ring. The method also involves forming, by additive manufacturing, a first clevis that includes an annular shroud adapted for positioning concentrically within a portion of the gimbal ring, and at least two lobes integrally formed with the shroud. Each lobe extends radially outward and axially over a portion of the gimbal ring, and has a bore extending therethrough for alignment with a respective bore of the gimbal ring. The method further involves forming, by additive manufacturing, a second clevis that includes an annular shroud adapted for positioning concentrically within a portion of the gimbal ring, and at least two lobes integrally formed with the shroud. Each lobe of the second clevis extends radially outward and axially over a portion of the gimbal ring, and has a bore extending therethrough for alignment with a respective bore of the gimbal ring. Additionally, the method involves sealedly coupling a first end of a bellows to the first clevis and a second end of the bellows to the second clevis.

In embodiments according to the third aspect, the method also involves aligning the bores of the at least two lobes of the first clevis with a first pair of bores of the set of bores of the gimbal ring, and aligning the bores of the at least two lobes of the second clevis with a second pair of bores of the set of bores of the gimbal ring. The method may further involve inserting a set of pins through each respective aligned pair of bore holes, to rigidly couple the first and second clevises to the gimbal ring.

In embodiments according to the third aspect, the method also involves forming, in the annular shroud of the first clevis, a plurality of circumferentially-spaced apertures that each extend axially between an inner surface of the annular shroud and the axially-extending slot. The method may further involve providing braze flux through one or more of the plurality of circumferentially-spaced apertures and proximate to the first end of said bellows. Additionally, the method may involve brazing the first end of said bellows to the first clevis.

According to a fourth aspect of the present invention, there is provided a sealed joint assembly for transmitting high temperature and high pressure fluid between adjoining ducts. The joint assembly includes a gimbal ring, a first clevis, a second clevis, and a bellows. The first clevis includes an annular shroud adapted for positioning concentrically within a portion of the gimbal ring, and at least two lobes integrally formed with the shroud. Each lobe of the first clevis extends radially outward and axially over a portion of the gimbal ring, and includes one or more gaps extending therethrough to produce a shear web of interconnected trusses extending across the lobe. Similarly, the second clevis includes an annular shroud adapted for positioning concentrically within a portion of the gimbal ring, and at least two lobes integrally formed with the shroud. Each lobe of the second clevis extends radially outward and axially over a portion of the gimbal ring, and includes one or more gaps extending therethrough to produce a shear web of interconnected trusses extending across the lobe. The bellows has a first end and a second end, with the first end being sealedly coupled to the first clevis, and the second end being sealedly coupled to the second clevis.

According to a fifth aspect of the present invention, there is provided a sealed joint assembly for transmitting high temperature and high pressure fluid between adjoining ducts. The joint assembly includes a gimbal ring, a first clevis, a second clevis, and a bellows. The gimbal ring includes an outer gimbal ring having a first set of bores circumferentially spaced about the outer gimbal ring; and an inner gimbal ring having a second set of bores circumferentially spaced about the inner gimbal ring. The first clevis includes a first annular shroud adapted for positioning concentrically within a portion of the outer gimbal ring. The first annular shroud has a distal end and at least two protrusions integrally formed with the first annular shroud. Each protrusion extends and protrudes axially away from the distal end, and each protrusion has a bore extending therethrough for alignment with a respective bore of the first set of bores in the outer gimbal ring and a respective bore of the second set of bores in the inner gimbal ring. Similarly, the second clevis includes a second annular shroud adapted for positioning concentrically within a portion of the outer gimbal ring. The second annular shroud has a proximal end and at least two protrusions extending and protruding axially away from the proximal end. Each protrusion has a bore extending therethrough for alignment with a respective bore of the first set of bores in the outer gimbal ring and a respective bore of the second set of bores in the inner gimbal ring. Both clevises are adapted to sealedly couple with a duct conveying high temperature and high pressure fluid. The bellows have a first end and a second end. The first end is sealedly coupled to the first clevis, and the second end is sealedly coupled to the second clevis. In this fifth aspect, at least one of the gimbal ring, the first clevis, and the second clevis is formed using geometrical and structural optimization.

In embodiments according to the fifth aspect, the outer gimbal ring is positioned concentrically about the first clevis and the second clevis, and the inner gimbal ring is positioned concentrically within the first clevis and the second clevis.

In embodiments according to the fifth aspect, the outer gimbal ring includes one or more struts extending circumferentially around a portion of the outer gimbal ring, and the inner gimbal ring includes one or more struts extending circumferentially around a portion of the inner gimbal ring. In some of these embodiments, the first clevis and the second clevis are substantially identical in shape and size. In other of these embodiments, the outer gimbal ring and the inner gimbal ring have substantially similar stiffness properties. In further of these embodiments, the one or more struts of the outer gimbal ring and the one or more struts of the inner gimbal ring are formed by the placement and omission of material according to geometrical and structural optimization. In some embodiments, the struts are formed via additive manufacturing. In other embodiments, the struts are formed via casting or machining.

In embodiments according to the fifth aspect, the one or more struts of the outer gimbal ring and the one or more struts of the inner gimbal ring each form a shear web. In some of these embodiments, the outer gimbal ring and the inner gimbal ring may be formed by additive manufacturing processes, as well as by more traditional methods of manufacturing, such as by casting or machining. Whether formed by additive manufacturing or more traditional processes, both the outer gimbal ring and the inner gimbal ring may be formed, as discussed below, with an optimized topology that takes into account the desire for the two gimbal ring components to withstand significant degrees of shear force, while also having a reduced mass. To ensure they are capable of withstanding the shear forces, the gimbal ring components could be formed, by machining, casting, or additive manufacturing, as solid, bulk structures that do not include any gaps or omissions in material. However, such a solid, bulk structure would not serve to reduce or minimize the mass of those components. Thus, to accomplish the joint goals of enabling the components to withstand significant shear forces while also minimizing their mass, the inner gimbal ring and outer gimbal ring components may further be formed to include one or more gaps formed by the specific placement of material at certain locations and the omission of material at other locations, such that, compared to equivalent solid structures, the gaps are configured to increase the stiffness-to-mass ratio of the outer gimbal ring and/or the inner gimbal ring.

In embodiments according to the fifth aspect, the sealed joint assembly further includes a first pair of pins and a second pair of pins. Each of the first pair of pins extends through a bore of the first set of bores in the outer gimbal ring, a bore of the second set of bores in the inner gimbal ring, and a respective bore of the first clevis. Each of the second pair of pins extends through a bore of the first set of bores in the outer gimbal ring, a bore of the second set of bores in the inner gimbal ring, and a respective bore of the second clevis.

In some embodiments according to the fifth aspect, at least one of the outer gimbal ring and the inner gimbal ring is constructed using additive manufacturing. In other embodiments according to the fifth aspect, at least one of the first clevis and the second clevis is constructed using additive manufacturing.

In some embodiments according to the fifth aspect, at least one of the first clevis and the second clevis has an optimized geometry that is computationally generated based on one or more dimensional constraints. In other embodiments according to the fifth aspect, at least one of the outer gimbal ring and the inner gimbal ring has an optimized geometry that is computationally generated based on one or more dimensional constraints. In further embodiments according to the fifth aspect, at least one of the first clevis and the second clevis has an optimized topology that is computationally generated based on one or more load specifications. In yet further embodiments according to the fifth aspect, at least one of the outer gimbal ring and the inner gimbal ring has an optimized topology that is computationally generated based on one or more load specifications.

According to a sixth aspect of the present invention, there is provided a joint assembly. The joint assembly includes a gimbal ring, a first clevis, and a second clevis. The gimbal ring includes an outer gimbal ring having a first set of bores circumferentially spaced about the outer gimbal ring; and an inner gimbal ring having a second set of bores circumferentially spaced about the inner gimbal ring. The first clevis includes a first annular shroud adapted for positioning concentrically within a portion of the outer gimbal ring. The first annular shroud has a distal end, and at least two protrusions integrally formed with the first annular shroud. Each protrusion extends and protrudes axially away from the distal end, and has a bore extending therethrough for alignment with a respective bore of the first set of bores in the outer gimbal ring and a respective bore of the second set of bores in the inner gimbal ring. The second clevis similarly includes a second annular shroud adapted for positioning concentrically within a portion of the outer gimbal ring. The second annular shroud has a proximal end, and at least two protrusions extending and protruding axially away from the proximal end. Each protrusion has a bore extending therethrough for alignment with a respective bore of the first set of bores in the outer gimbal ring and a respective bore of the second set of bores in the inner gimbal ring. In this sixth aspect, at least one of the gimbal ring, the first clevis, and the second clevis is formed using geometrical and structural optimization.

In embodiments according to the sixth aspect, the outer gimbal ring is positioned concentrically about the first clevis and the second clevis, and the inner gimbal ring is positioned concentrically within the first clevis and the second clevis.

In embodiments according to the sixth aspect, the outer gimbal ring comprises one or more struts extending circumferentially around a portion of the outer gimbal ring, and the inner gimbal ring comprises one or more struts extending circumferentially around a portion of the inner gimbal ring.

In embodiments according to the sixth aspect, the outer gimbal ring and the inner gimbal ring have substantially similar stiffness properties.

According to a seventh aspect of the present invention, there is provided a method of manufacturing a sealed gimbal joint for transmitting high temperature and high pressure fluid between adjoining ducts. The method involves forming, a gimbal ring that includes an outer gimbal ring having a first set of bores circumferentially spaced thereabout and an inner gimbal ring having a second set of bores circumferentially spaced thereabout. The method also involves forming, a first clevis that includes a first annular shroud adapted for positioning concentrically within a portion of the outer gimbal ring. The first annular shroud has a distal end, and at least two protrusions integrally formed with the first annular shroud. Each protrusion extends and protrudes axially away from the distal end, and has a bore extending therethrough for alignment with a respective bore of the first set of bores in the outer gimbal ring and a respective bore of the second set of bores in the inner gimbal ring. The method further involves forming a second clevis that includes a second annular shroud adapted for positioning concentrically within a portion of the outer gimbal ring. The second annular shroud has a proximal end, and at least two protrusions extending and protruding axially away from the proximal end. Each protrusion has a bore extending therethrough for alignment with a respective bore of the first set of bores in the outer gimbal ring and a respective bore of the second set of bores in the inner gimbal ring. The first and second clevises are each adapted to sealedly couple with a duct conveying high temperature and high pressure fluid. The method then involves sealedly coupling a first end of a bellows to the first clevis and a second end of the bellows to the second clevis, such as by welding, brazing or sintering. In this seventh aspect, at least one of the gimbal ring, the first clevis, and the second clevis is formed using geometrical and structural optimization.

In embodiments according to the seventh aspect, the method further involves aligning each of the bores of the at least two protrusions of the first clevis with a first pair of bores from the first set of bores and a second pair of bores from the second set of bores, and aligning each of the bores of the at least two protrusions of the second clevis with a third pair of bores from the first set of bores and a fourth pair of bores from the second set of bores. The method then involves inserting a set of pins through each respective aligned pair of bores, to rigidly couple the first and second clevises to the first and second gimbal rings. In some embodiments according to the seventh aspect, the step of forming the gimbal ring, the first clevis and the second clevis may be accomplished by additive manufacturing. In other embodiments according to the seventh aspect, the step of forming the gimbal ring, the first clevis and the second clevis may be accomplished by machining or casting.

In an eighth aspect of the present invention, there is provided a sealed joint assembly for transmitting high temperature and high pressure fluid between adjoining ducts. The joint assembly includes a gimbal ring having one or more struts extending circumferentially thereabout, and that has a first set of bores circumferentially spaced thereabout. The joint assembly further includes a first clevis and a second clevis. The first clevis includes an annular shroud adapted for positioning concentrically within a portion of the gimbal ring, and a second set of bores circumferentially spaced thereabout, for respective alignment with the first set of bores of the gimbal ring. The second clevis includes an annular shroud adapted for positioning concentrically within a portion of the gimbal ring, and a third set of bores circumferentially spaced thereabout, for respective alignment with the first set of bores of the gimbal ring. The joint assembly also includes a bellows having a first end and a second end. The first end is sealedly coupled to the first clevis and the second end is sealedly coupled to the second clevis. In this eighth aspect, at least one of the gimbal ring, the first clevis, and the second clevis is formed using geometrical and structural optimization.

The foregoing summary is illustrative only and is not intended to be in any way limiting. In addition to the illustrative aspects, embodiments, and features described above, further aspects, embodiments and features will become apparent by reference to the drawing figures, the following detailed description, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the invention, and to show how the same may be implemented, there will now be described by way of example only, specific embodiments, methods and processes according to the present invention with reference to the accompanying drawings in which.

DETAILED DESCRIPTION OF THE EMBODIMENTS

Figure 1A:
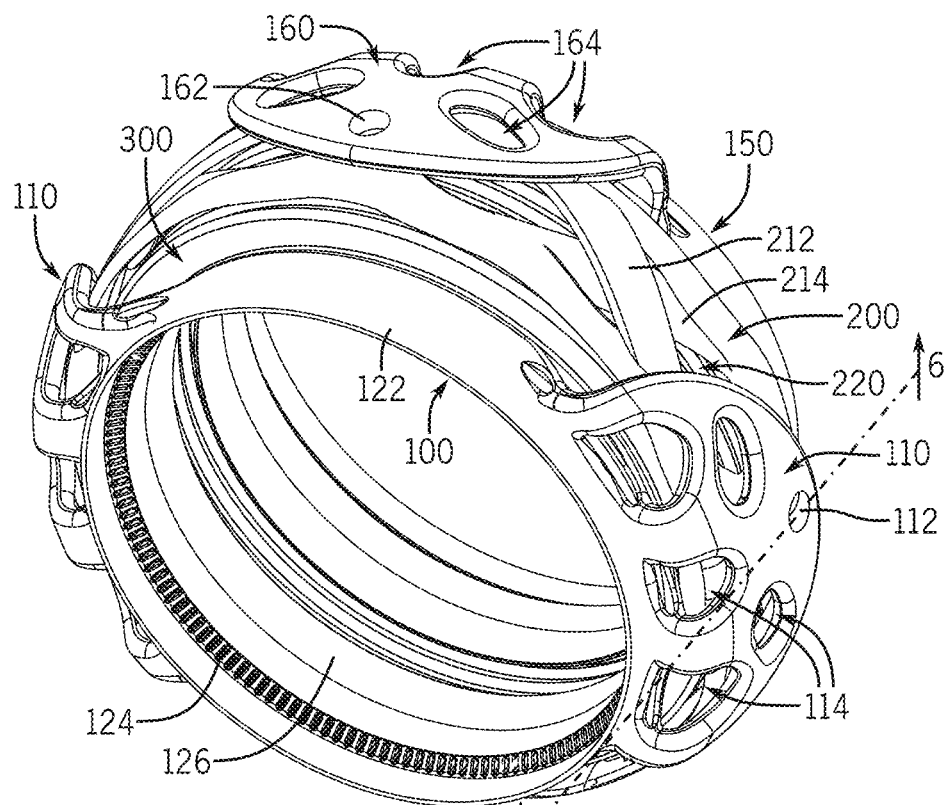
FIG. 1A is a perspective view of an example sealed gimbal joint assembly according to the present invention.

There will now be described by way of example, several specific modes of the invention as contemplated by the inventors. In the following description, numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description of the invention.

As described above, it is an objective of the present invention to provide gimbal joint designs and optimization techniques that balance the strength and structural integrity of the gimbal joint with the overall weight of the gimbal joint assembly. The gimbal joints may be geometrically optimized and/or topologically optimized, such that the gimbal joint assembly satisfies a set of design requirements and anticipated loads, while simultaneously minimizing or reducing the weight of the assembly. The optimization described herein may be geometrical and structural optimization, which relates to various arrangements and configurations of independent struts, shear web structures, and other similar support structures.

Gimbal joints of the present disclosure include two clevises and a central gimbal ring disposed between the clevises. Each of the clevises and/or the gimbal ring may include topological or structural features—such as spaces, gaps, apertures, struts, trusses, gussets, and/or braces, among other features—that maintain and/or improve structural integrity with a reduced amount of material, at least compared to solid structures. For example, rather than providing clevises with solid projected lugs or lobes, embodiments of the present disclosure include clevis lobes with one or more gaps or apertures (separate from and in addition to pin holes). The remaining material in the clevis lobes act as an interconnected web of trusses that are capable of handling compressive, tensile, and shear stresses, while reducing the weight of the clevis.

Likewise, the central gimbal ring may include one or more structural features integrally formed therein that extend circumferentially about the gimbal ring. For instance, gimbal rings of the present invention may possess integrally formed strut or truss structures that maintain and/or enhance the gimbal ring's compliance with one or more structural requirements. For example, a gimbal ring may include crisscrossing, overlapping struts capable of bearing compressive and shear loads while also reducing the weight of the gimbal ring. Example gimbal ring constructions are shown and described in more detail below.

As described herein, "optimizing" the shape, geometry, and/or topology of a gimbal joint or its components generally refers to a process by which the geometry and/or the topology of a component is generated, refined, improved, or otherwise modified empirically to better accomplish one or more goals. For example, an initial design for a component may be optimized by analyzing or simulating the strain energy and/or load distribution when the component is subjected to various forces. One goal for the optimization may involve minimizing or reducing the strain energy of the structure to below an acceptable threshold. The optimization, however, may consider one or more constraints and/or boundary conditions that serve as geometric limitations, limitations of a particular manufacturing process, and/or other constraints that must or should be adhered to. Additionally, an optimization may attempt to refine a geometry or topology that minimizes or reduces strain energy, while simultaneously minimizes or reduces the weight of the component. Thus, the term "optimizing" may refer to a process by which a component's design is modified to better accomplish, on balance, one or more goals in view of one or more costs. Further, it should be understood that "optimizing" may not necessarily refer to an absolutely optimal solution or design, and instead may refer to a solution or design that is satisfactory for a particular purpose.

In particular, the optimization described herein may include geometrical and structural optimization. Geometrical and structural optimization refers to a refinement and configuration of primary, independent structural members (e.g., struts) and their supporting and supported elements. These independent structural members may be structured to diverge from or converge to mutually shared nexuses or interfacing features, and may be further configured to overlap or be parallel in any orientation. In some arrangements, these independent structural members may be entirely disconnected and still perform as a cohesive system to achieve similar performance as when connected. By connecting these structural members via relatively less-structural or non-structural members, membranes, and micro-structures, these structural members and their supporting elements may result in voids or gaps in geometry. Structural members and their supporting elements may blend and merge with supported elements, which may include traditionally bulk sections, pin and bearing geometry, interfacing geometry, and aesthetic geometry (e.g., manufactured text). As such, optimizing a component includes affecting some combination of amount of material, configuration of material, and interaction of structural members (e.g., membranes, shear webs, etc.).

In optimizing the geometrical and structural characteristics of a particular component, one or more parameters is focused upon, and the geometry or structure of the component is adjusted in order to substantially optimize the one or more parameters (i.e., generate a substantially best value for that parameter). These parameters may include, but are not limited to, viability of additive manufacturing, performance requirements, material cost, time constraints, schedule considerations, aesthetic purposes, compacting of assemblies due to efficient occupation of space between components, complexity of design, weight constraints, etc. For example, if the focused-upon parameters are overall weight of the component and performance requirements, geometrical and structural optimization of the component would generate an arrangement of structural members and supporting elements that substantially minimized the weight of the component while still meeting performance requirements. In this way, a geometrically and structurally optimized component is differentiable from a traditionally-designed and manufactured component.

As described herein, "bellows" refers to any type of fluid-tight conduit for conveying gasses or other fluids. Although the term "bellows" sometimes refers to a conduit with a series of convolutions, which impart flexibility and/or expandability to the conduit, the present disclosure may generally refer to "bellows" as encompassing conduits with or without such convolutions, in which sleeves or ducts extend to connect the two opposed ducts to transfer, under seal, the fluids being transferred therebetween.

As described herein, "additive manufacturing" may refer to any manufacturing process or technique for producing three dimensional objects by depositing or fusing material in a series of layers by a computer-controlled fabricator or laser. Some example additive manufacturing techniques include laser powder bed fusion (LPBF), material extrusion, selective laser sintering (SLS), selective laser melting (SLM), among other three-dimensional (3D) printing techniques. Additive manufacturing may involve, for instance, fusing metal powder in layers to construct a 3D component. To this end, the "material" described herein as comprising the gimbal joint may be any material capable of being used in an additive manufacturing process. For example, the material may be titanium, Inconel 718, or any other type of material known to have sufficient strength and rigidity features. The present disclosure is not limited to any particular material or additive manufacturing technique, and may be applicable to both metals and composites, amongst other materials.

As described herein, the "shear web" may refer to a network of trusses, struts, gussets, and/or other reinforcements that are integrally formed with each other to form a structure that has gaps or spaces. Topologically, a shear web may refer to a structure that is a two-dimensional manifold comprised of one or more tori (e.g., a genus-two surface, a genus-three surface, or any other connected sum of one or more tori). A shear web may serve as a suitable replacement for a solid and continuous structure, reducing the weight of a component without compromising the structural integrity of that component.

Various aspects of a gimbal joint—including the sizes, shapes, and arrangement of lobes, struts, trusses, gussets, apertures, and other structural elements—may vary depending upon the particular application and engineering requirements for the desired gimbal joint. Thus, for example, a gimbal joint design for adjoining ducts conveying low pressure and low temperature gasses may possess different structural features having differing dimensions from those shown and described explicitly herein. The present disclosure encompasses varying aspects of the gimbal joint design to be suitable for different purposes, and the present application is not limited to the gimbal joint designs explicitly shown in the drawings.

Referring to the embodiment of FIGS. 1A-7B, FIG. 1A depicts a perspective view of an example sealed gimbal joint assembly of the present invention. The sealed gimbal joint assembly includes first clevis 100, second clevis 150, gimbal ring 200 disposed between first clevis 100 and second clevis 150, and bellows 300 sealedly coupled to and extending between first clevis 100 and second clevis 150. In the assembled state shown in FIG. 1A, the inner surfaces of first clevis 100, second clevis 150, and bellows 300 form a fluid-tight gas passage adapted for use in high temperature and high pressure environments, such as in bleed air systems for jet engine aircrafts.

First clevis 100 includes a substantially annular shroud formed from distal section 122 and proximal section 126 that is integrally formed with distal section 122. With the sealed gimbal joint assembly in its assembled state, distal section 122 is positioned axially nearer to second clevis 150 and gimbal ring 200 than proximal section 126. In the example according to FIGS. 1A-7B, distal section 122 has a larger radius relative to the radius of proximal section 126, which may permit the distal section 122 to be fitted about an adjoining pipe or duct (see, for example, FIGS. 7A and 7B).

First clevis 100 also includes a pair of lobes 110 that each extend radially outwardly from the annular shroud and axially over a portion of gimbal ring 200. Each lobe 110 may be integrally formed with the annular shroud of first clevis 100 and extend from distal section 122 and/or proximal section 126. In the example embodiment shown in FIGS. 1A-7B, each lobe 110 extends from the outer surface of distal section 122. Each lobe 110 also includes bore hole 112, which aligns with a respective bore hole 222 in gimbal ring 200 (see FIG. 4).

Each lobe 110 may include one or more gaps 114, in which a substantial amount of material is omitted during the formation of first clevis 100. In the example shown in FIG. 1A, each lobe 110 includes five substantially-sized gaps 114. Gaps 114 may be formed by omitted material that reduces the overall weight of first clevis 100, while substantially maintaining or improving the structural integrity of first clevis 100. The combination of gaps 114 and material used to form lobe 110 may form a "shear web," such that the interconnected material forms a network of struts, trusses, and/or gussets capable of preventing deformation when subjected to a load, but at a reduced weight—as compared to a solid, non-gapped clevis structure. In some implementations, the size, shape, location, and distribution of gaps 114 may be determined or modified computationally, via geometric optimization and/or topological optimization. Example optimization techniques are described in greater detail below.

In some implementations, first clevis 110 may include a plurality of circumferentially-spaced apertures 124 that axially extend between the inner surface of distal section 122 to the outer surface of proximal end 126. Apertures 124 may be used to convey solder, braze flux, or an adhesive into axially-extending slot 125 (shown in more detail in FIGS. 5 and 6). Axially-extending slot 125 may receive first end 304 of bellows 300, which may be sealedly joined to first clevis 110 by soldering, brazing, welding, adhesion, and/or other joining methods.

Second clevis 150 may be similar to or the same as first clevis 100. Like first clevis 100, second clevis 150 includes a pair of lobes 160 disposed approximately 180° apart from each other. Second clevis 150 may be oriented oppositely to first clevis 100, such that lobes 160 extend axially toward first clevis 100, and lobes 110 extend axially toward second clevis 150. In its assembled state, second clevis 150 is rotated 90° relative to first clevis 100 about their shared central axis, such that each lobe 160 is spaced approximately 90° from adjacent lobes 110. As with lobes 110, each lobe 160 includes one or more gaps 164 of omitted dispensable material, and bore hole 162 for receiving a pin, lug, or other connector (not shown in FIGS. 1A-7B).

First clevis 100 and second clevis 150 may be oriented so as to align bore holes 112 and 162 of lobes 110 and 160, respectively, to bore holes 222 formed within gimbal ring 200. Pins, lugs, or other connectors may be placed through aligned bore holes 112, 162, and 222, which may subsequently be welded, brazed, or otherwise held in place to couple first clevis 100 to gimbal ring 200 and second clevis 100 to gimbal ring 200. In this arrangement, first clevis 100 and gimbal ring 200 form a revolute joint that enables first clevis 100 to deflect angularly about an axis that extends through bore holes 112 of first clevis 100. Likewise, second clevis 150 and gimbal ring 200 form a revolute joint that enables second clevis 100 to deflect angularly about a different axis which extends through bore holes 162 of second clevis 150. In this manner, second clevis 150 may be angularly deflected in two degrees of freedom relative to first clevis 100. An example of such angular deflection is illustrated in FIG. 7B.

Figure 2:
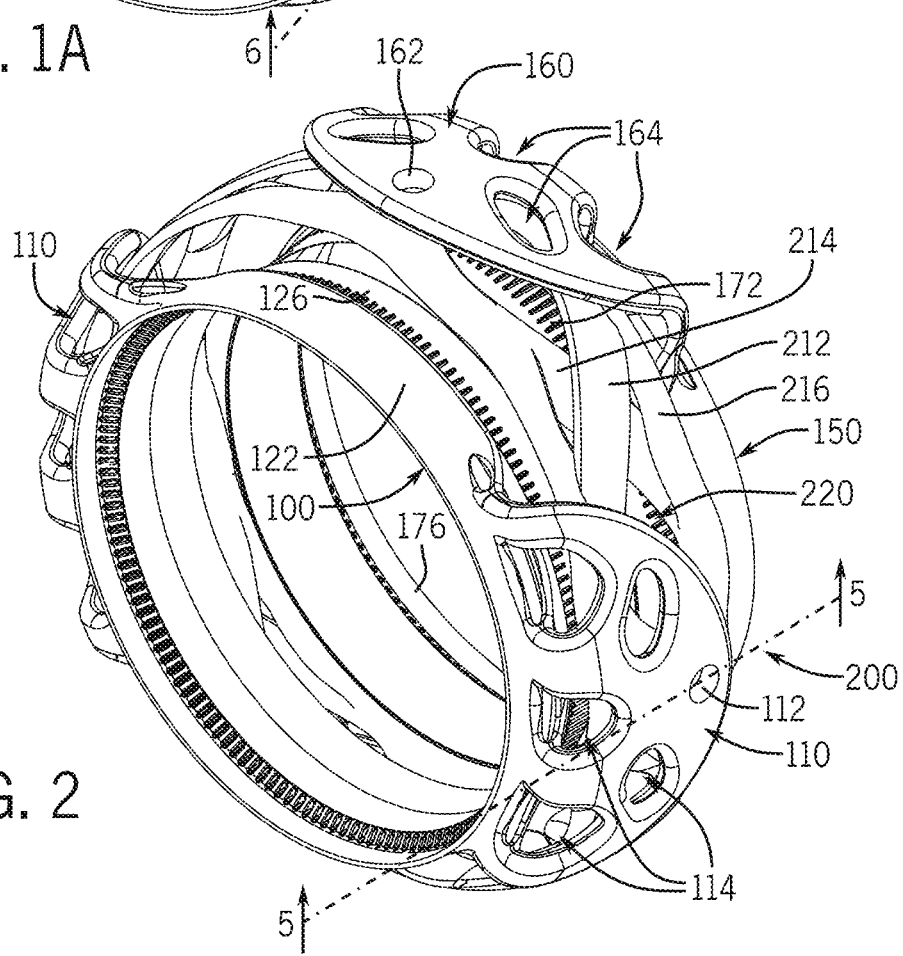
FIG. 2 is a repositioned perspective view of two clevises and a gimbal ring of the example gimbal joint assembly, according to the embodiment of FIG. 1A.
Figure 3:
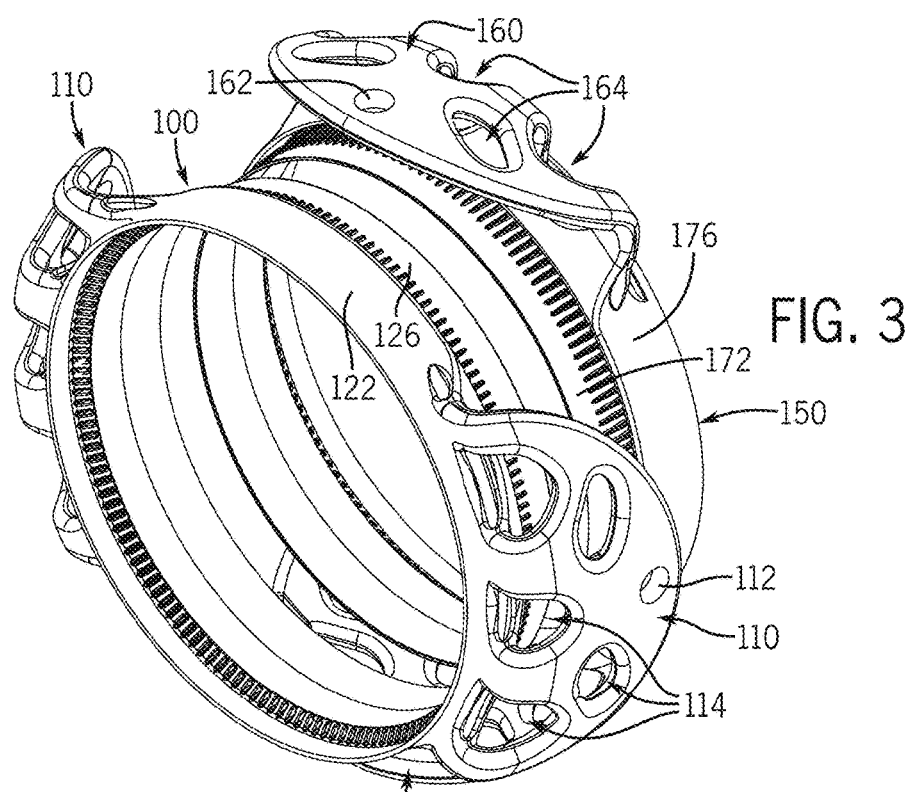
FIG. 3 is a perspective view of the two clevises of the example gimbal joint assembly, according to the embodiment of FIG. 1A.

Second clevis 150, like first clevis 100, also includes distal section 172 and proximal section 176, and may further include a plurality of circumferentially-spaced apertures 174. The features of second clevis 150 are shown in FIGS. 2 and 3 in more detail, in which FIG. 2 omits bellows 300, and FIG. 3 omits bellows 300 and gimbal ring 200.

Figure 1B:
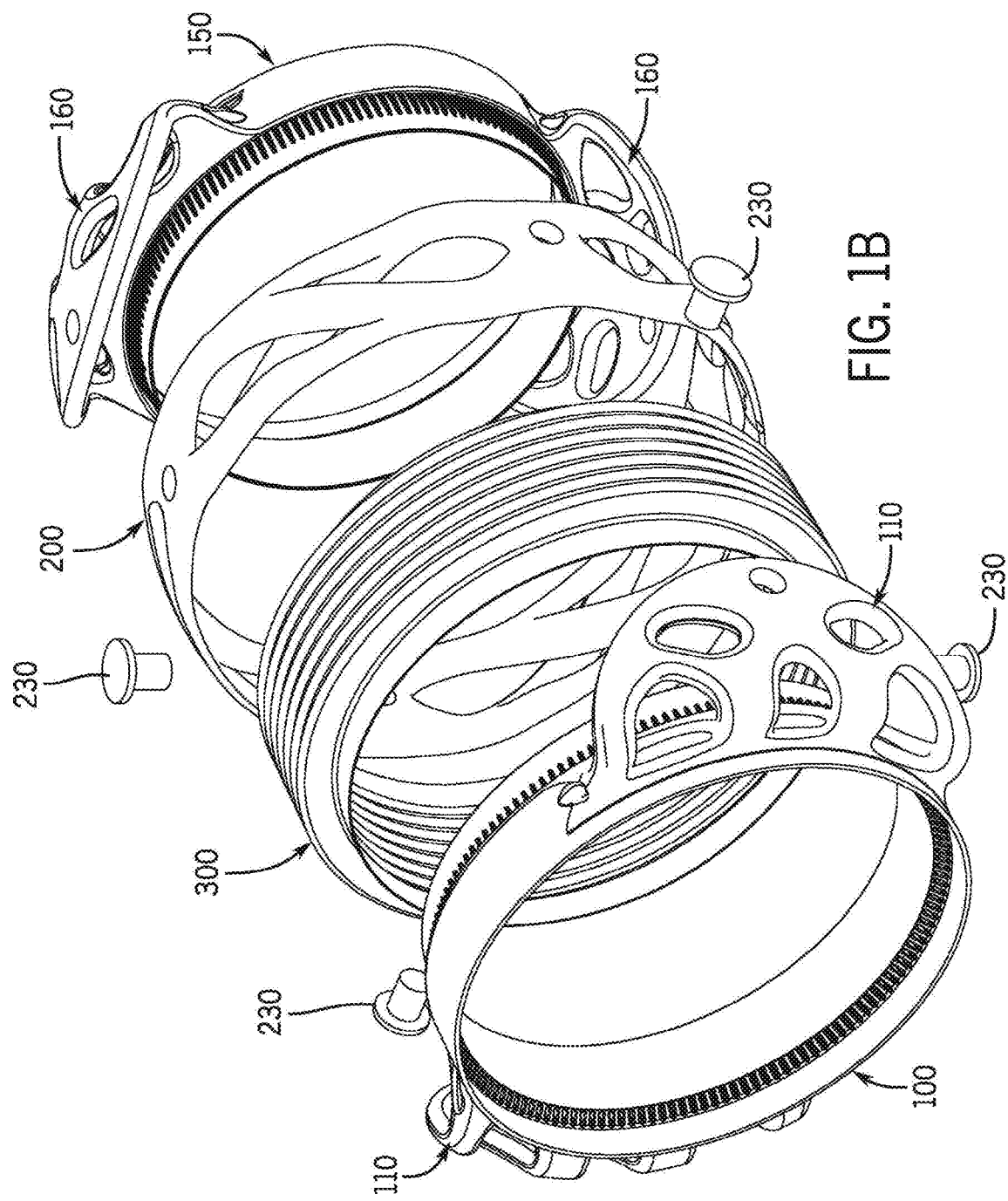
FIG. 1B is an exploded perspective view of the example gimbal joint assembly, according to the embodiment of FIG. 1A.

FIG. 1B depicts the gimbal joint assembly shown in FIG. 1A in an exploded perspective view. As shown in FIG. 1B, bellows 300 may be concentrically positioned within gimbal ring 200, with clevises 100 and 150 positioned on opposite ends of bellows 300. Pins 230 may be inserted through aligned bore holes 112 and 222 of first clevis 110 and gimbal ring 200, respectively. Likewise, pins 230 may be inserted through aligned bore holes 162 and 222 of first clevis 110 and gimbal ring 200 respectively. Pins 230 may, in some implementations, be welded, brazed, or otherwise secured in place.

Figure 4:
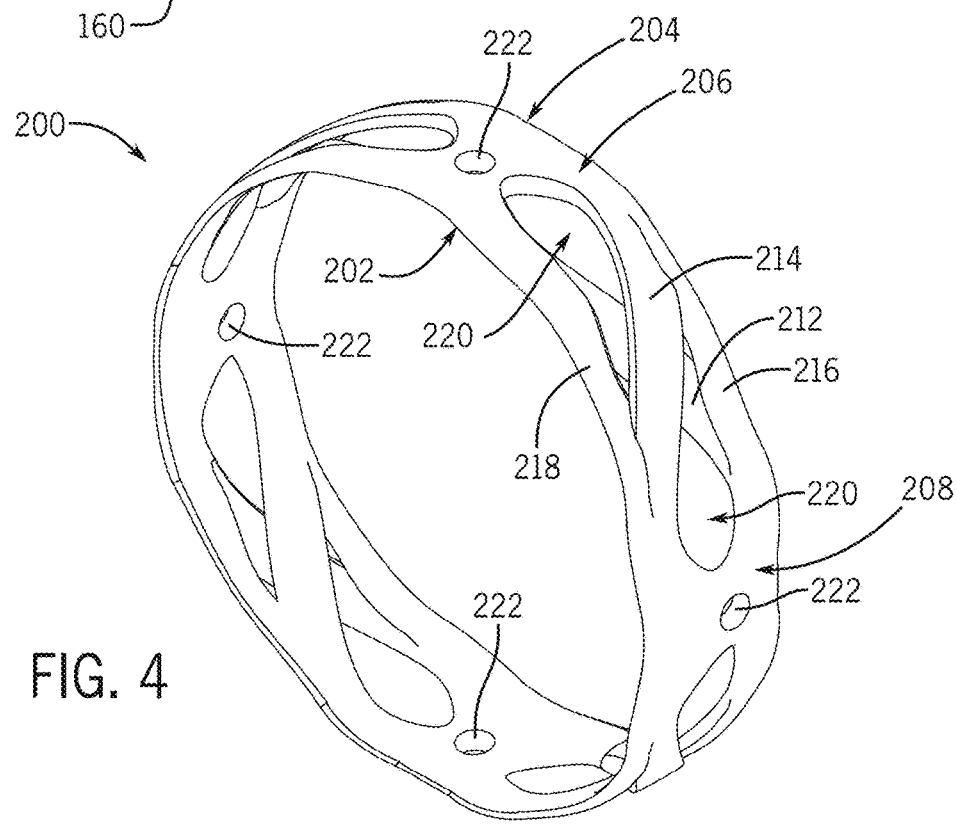
FIG. 4 is a perspective view of the gimbal ring of the example gimbal joint assembly, according to the embodiment of FIG. 1A.

Referring to FIG. 4, gimbal ring 200 is a substantially annular structure that includes struts 212, 214, 216, and 218, gaps 220, and bore holes 222. In the particular implementation shown in FIG. 4, bore holes 222 are circumferentially spaced apart by approximately 90°. Similar to lobes 110 and 160, gimbal ring 200 is not a continuously solid structure, but instead includes gaps 220 where dispensable or extraneous (at least with respect to a particular set of structural requirements) material is omitted.

In this particular example, gimbal ring 200 includes four sets of struts 212, 214, 216, and 218. Strut 212 diagonally extends from first side 202 of gimbal ring 200 at first region 206 to second side 204 of gimbal ring 200 at second region 208. Similarly, strut 214 diagonally extends from second side 204 of gimbal ring 200 at first region 206 to first side 202 of gimbal ring 200 at second region 208. Strut 214 overlaps strut 212, such that strut 214 is positioned radially outwardly from strut 212. At the location where struts 212 and 214 overlap, struts 212 and 214 are not connected. This overlapping strut arrangement enables gimbal ring 200 to resist shear forces, while adequately maintaining compliance with other anticipated loads during operation. In addition, the overlapping strut arrangement may possess a geometry that enables struts 212 and 214 to translate relative to each other, but without making direct contact with each other, thereby reducing the amount of wear experienced by gimbal ring 200 over time. Struts 212 and 214 may be integrally formed with first region 206 and second region 208, such that gimbal ring 200 can be formed as a single component.

In some embodiments, gimbal ring 200 also includes side struts 216 and 218, which serve as additional reinforcing structures for gimbal ring 200. Strut 216 extends from second side 204 of first region 206 to second side 204 of second region 208, while strut 218 extends from first side 202 of first region 206 to first side 202 of second region 208. Collectively, struts 212, 214, 216, and 218 may form a truss network that provides comparable or improved structural compliance, but with less material and at a lower weight relative to traditional solid and continuous gimbal rings.

Figure 5:
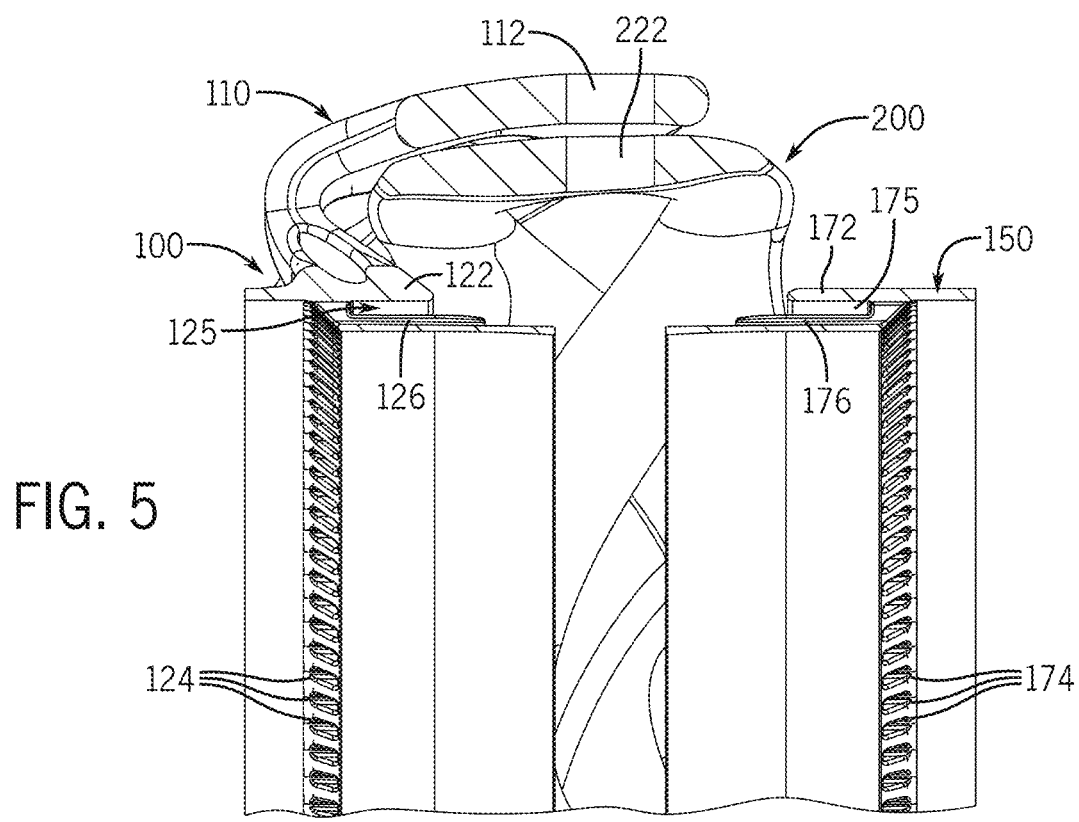
FIG. 5 is an elevated cross-sectional side view of the example gimbal joint assembly, according to the embodiment of FIG. 2, taken along lines 5-5 and looking in the direction of the arrows.
Figure 6:
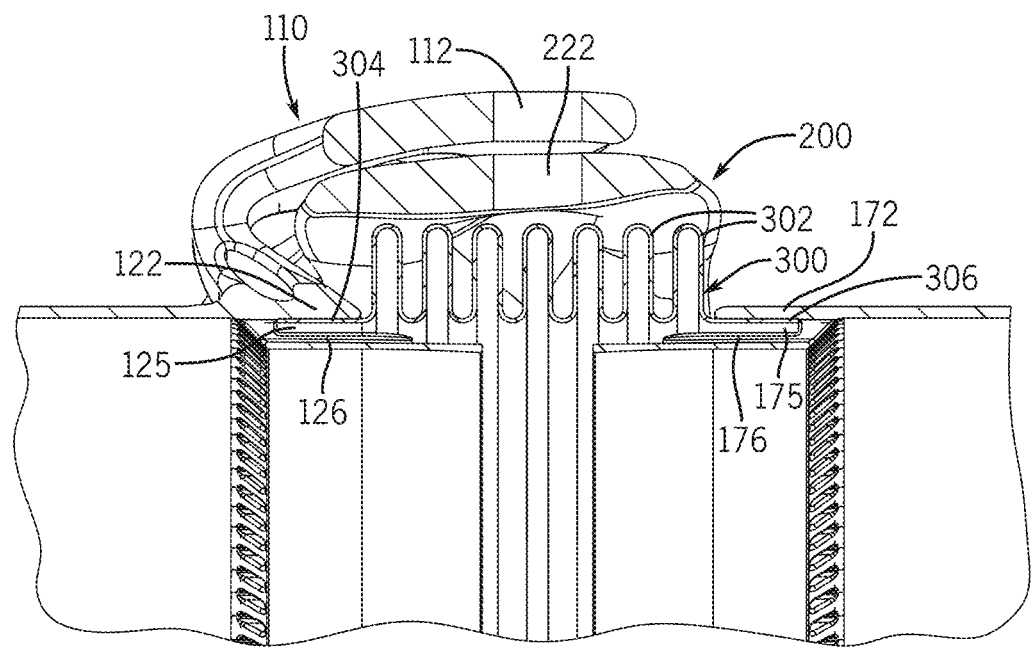
FIG. 6 is an elevated cross-sectional side view of the example gimbal joint assembly, according to the embodiment of FIG. 1A, taken along lines 6-6 and looking in the direction of the arrows.

Referring to FIGS. 5 and 6, FIG. 5 illustrates an elevated cross-sectional view of the gimbal joint assembly shown in FIG. 2, taken along lines 5-5. As is shown in FIG. 5, annular distal section 122 of first clevis 100 extends over a portion of annular proximal section 126, forming axially-extending slot 125. Likewise, annular distal section 172 of second clevis 150 extends over a portion of annular proximal section 176, forming axially-extending slot 175. Slots 125 and 175 may be narrow slots adapted to receive ends 304 and 306 of bellows 300, respectively, which is shown in FIG. 6. As described above, apertures 124 and 174 may be used to convey braze flux or an adhesive into slots 125 and 175, respectively, to in turn sealedly couple joint bellows 300 to first clevis 100 and second clevis 150. However, apertures 127 and 174 are optional features, and other methods for adjoining bellows 300 to first clevis 100 and second clevis 150 may also be used.

FIGS. 5 and 6 also illustrate the alignment of bore hole 112 of first clevis 100 and bore hole 222 of gimbal ring 200. A pin, lug, or other connector may be inserted through aligned bore holes 112 and 222, thereby coupling first clevis 100 to gimbal ring 200. A similar joining technique may also be used for aligned bore holes 162 and 222 (not shown in FIGS. 5 and 6).

Figure 7A:
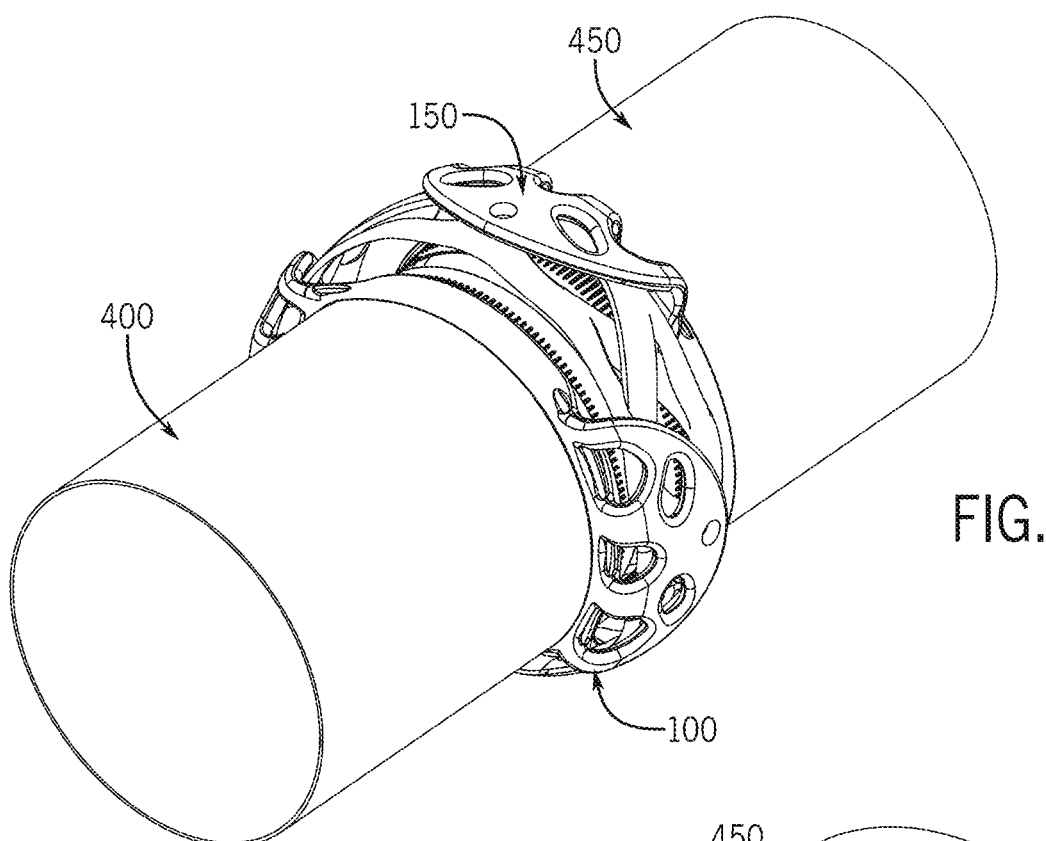
FIG. 7A is a perspective view of an example gimbal joint assembly adjoined with a pair of ducts in an aligned position.
Figure 7B:
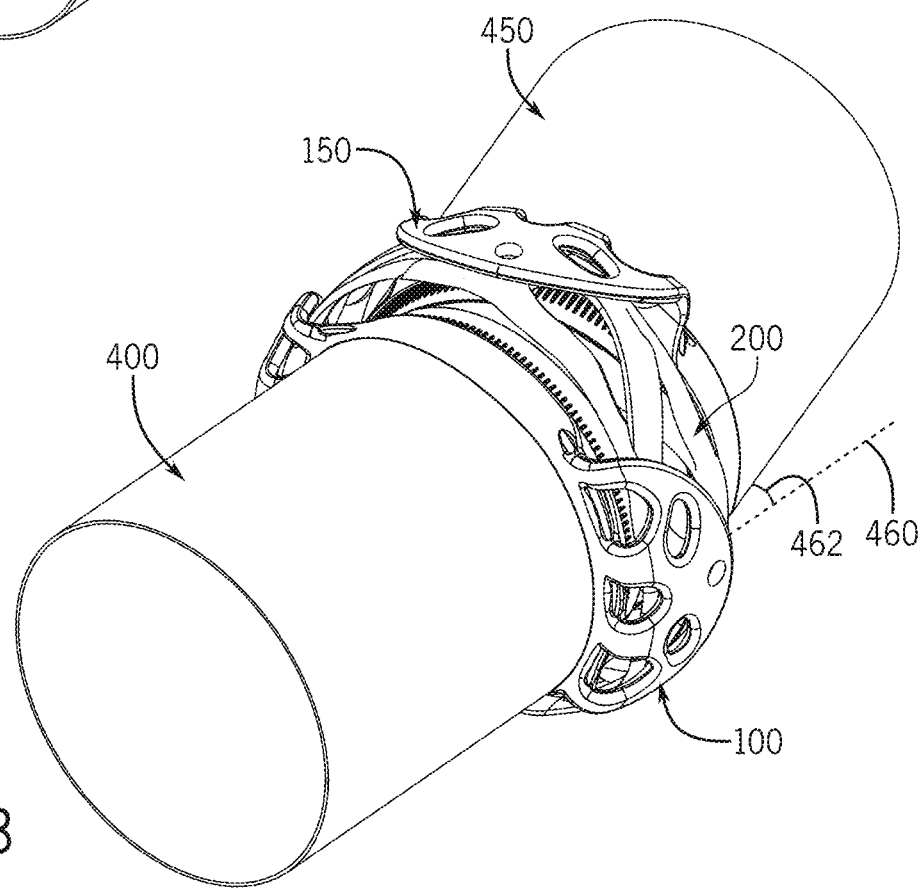
FIG. 7B is a perspective view of an example gimbal joint assembly adjoined with the pair of ducts in an angularly deflected position, relative to the embodiment of FIG. 7A.

FIGS. 7A and 7B illustrate an example application, in which first clevis 100 is coupled to duct 400, and second clevis 150 is coupled to duct 450. FIG. 7A depicts an assembly in which the gimbal joint is not under load, such that ducts 400 and 450 are aligned and have no angular deflection relative to each other. In contrast, FIG. 7B depicts a scenario in which the gimbal joint assembly is under load, causing duct 450 to gimbal at an angle 462 relative to axis 460 of duct 400.

As shown in FIG. 7B, the revolute joint formed by lobes 160 of second clevis 150 enables duct 450 to deflect to the left (from the perspective shown in FIG. 7B). Similarly, the revolute joint formed by lobes 110 of first clevis 100 enables duct 450 to deflect upwardly (from the perspective shown in FIG. 7B). Thus, the gimbal joint assembly formed from first clevis 100, second clevis 150, and gimbal ring 200 enables angular deflection in two degrees of freedom.

FIGS. 8-14F depict an alternative embodiment gimbal joint assembly, which may be referred to herein as an "interlocking" or "double-shear" gimbal joint design. Similar to the embodiment shown and described above with respect to FIGS. 1A-7A, the interlocking gimbal joint assembly includes a pair of clevises (first clevis 500 and second clevis 550) positioned within the gimbal ring itself (gimbal ring 600). In addition, first clevis 500 and second clevis 550 include pairs of integrally formed and topologically efficient lobes 510 and 560, respectively, that include bore holes (such as bore hole 512 shown in FIG. 14F) that align with respective bore holes 620 formed in gimbal ring 600. Pins, such as pin 630 or pin 640 shown in FIG. 12, may be inserted through the aligned bore holes to couple gimbal ring 600 to first clevis 500 and second clevis 550.

As mentioned, unlike the embodiment shown and described above with respect to FIGS. 1A-7A, in which gimbal ring 200 was positioned concentrically within lobes 110 and 160, nearly all of first clevis 500 and second clevis 550 are disposed concentrically within gimbal ring 600. In addition, whereas gimbal ring 200 includes overlapping crisscrossing struts 212 and 214, gimbal ring 600 includes a diagonally-extending strut 612 and a pair of axially-extending trusses 614 and 616, which collectively form a shear web to impart structural rigidity to gimbal ring 600.

First clevis 500 and second clevis 550 may possess one or more features of clevises 100 and 150 described above. For example, clevises 500 and 550 may include distal sections 522 and 572, respectively, and proximal ends 524 and 574, respectively. In addition, clevises 500 and 550 may also include axially-extending slots 525 and 575 for receiving ends of a bellows (not shown). Clevises 500 and 550 may include any combination of clevis or lobe features described herein with respect to any of the embodiments of the present disclosure.

Figure 8:
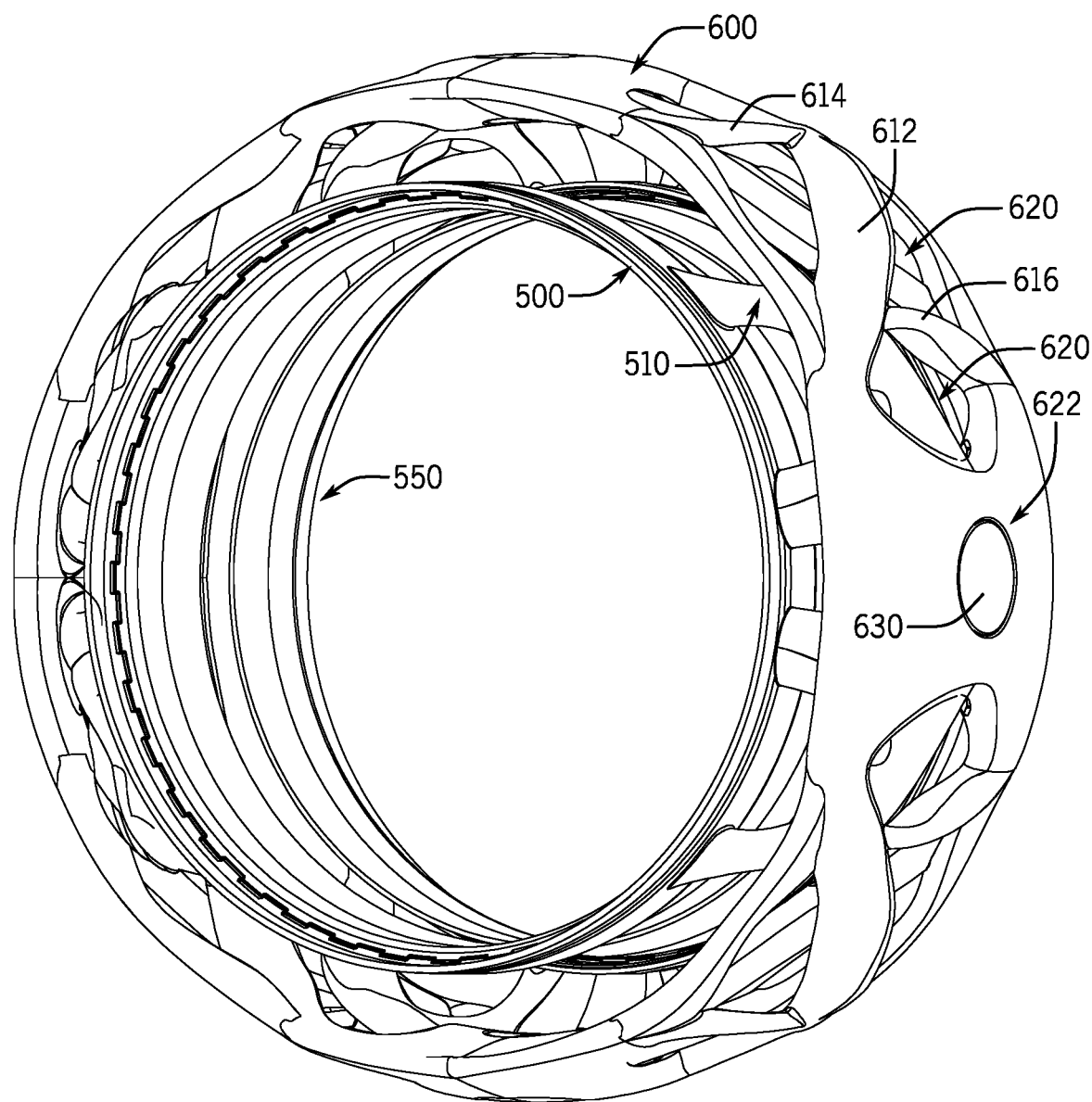
FIG. 8 is a perspective view of another embodiment of the interlocking gimbal joint assembly of the present invention, in which the clevises are positioned within the central gimbal ring, instead of positioned about the gimbal ring, as shown in FIGS. 1A through 7B.
Figure 9:
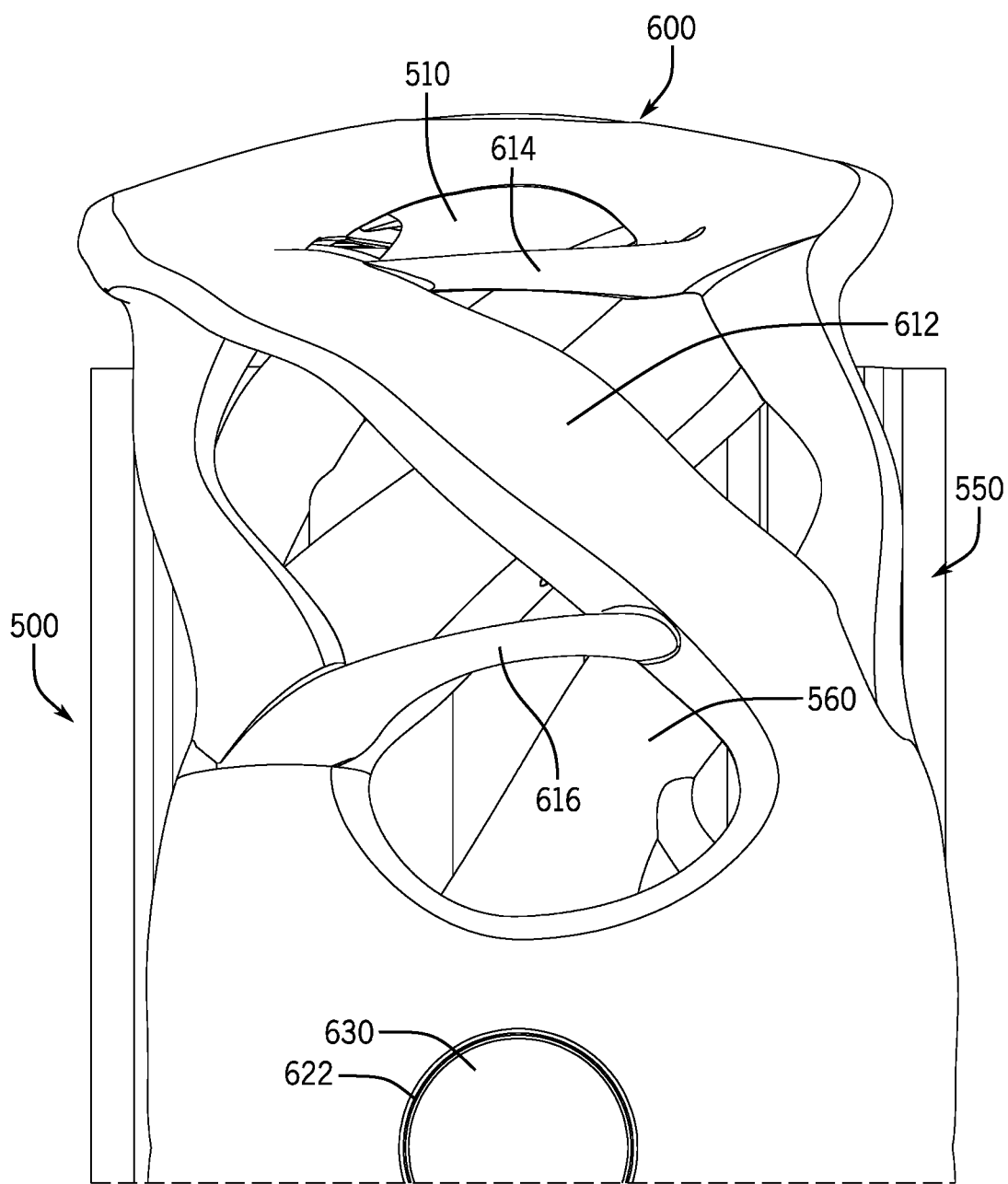
FIG. 9 is a detailed, elevated side view of the example interlocking gimbal joint assembly, according to the embodiment of FIG. 8.
Figure 11:
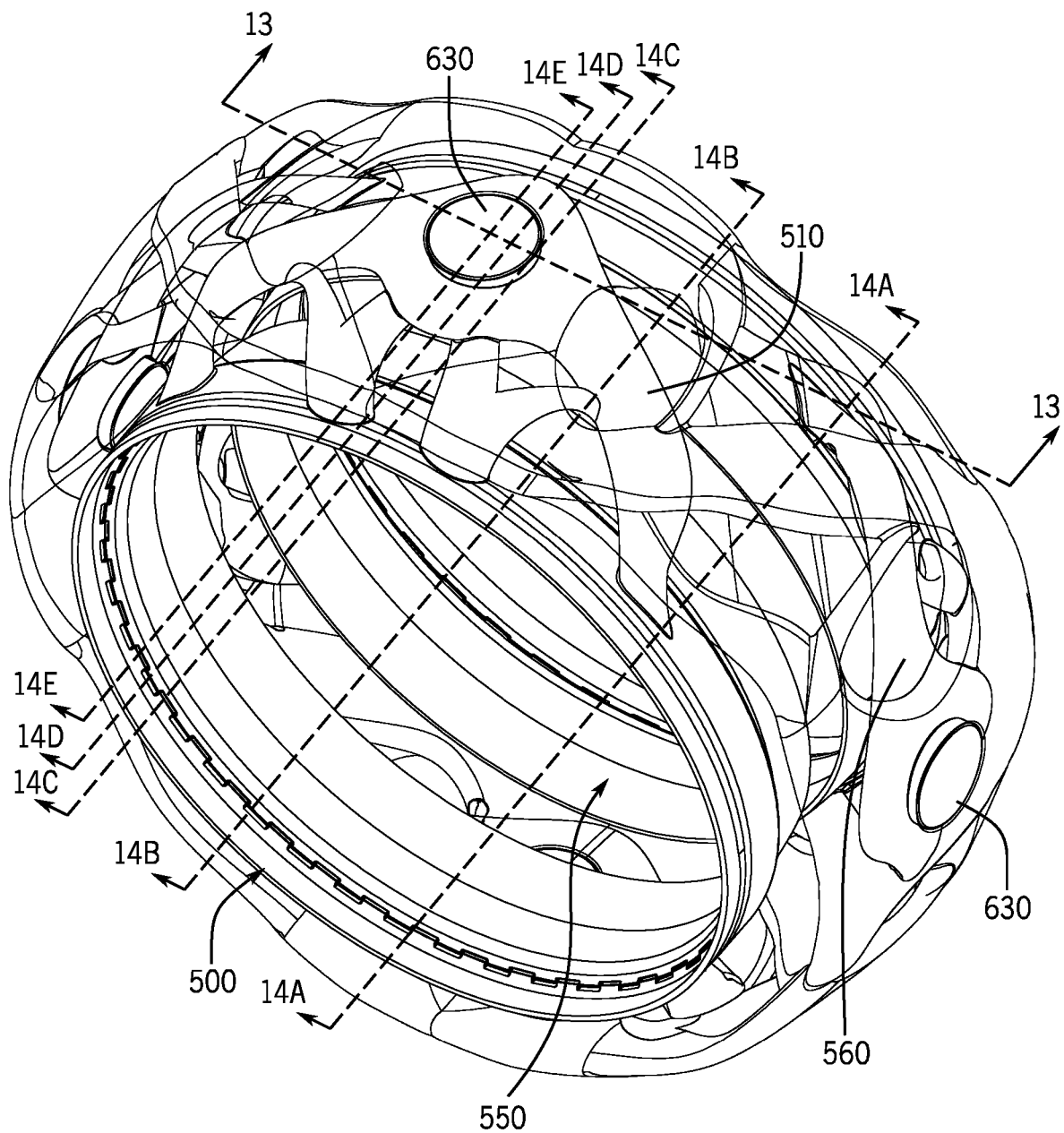
FIG. 11 is a perspective phantom view of the example interlocking gimbal joint assembly, with a substantially transparent gimbal ring shown for explanatory purposes, according to the embodiment of FIG. 8.

FIG. 11 illustrates the example interlocking gimbal joint assembly according to the embodiment of FIG. 8, but with gimbal ring 600 shown as being translucent. The translucency of gimbal ring 600 is provided for explanatory purposes, and does not necessarily indicate the types of materials that can be used in forming gimbal ring 600. As shown in FIG. 11, lobe 510 extends from the outer surface of the annular portion of first clevis 500, both axially and radially. The shape of lobe 510 is similar to that of a hook or anchor. Around pin 630, gimbal ring 600 includes a C-shaped underhanging "mouth" portion that extends radially beneath lobe 510, forming a pocket into which a portion of lobe 510 is positioned. The "pocket" structure of gimbal ring 600 is shown in more detail in the cross-sectional views of FIGS. 13 and 14A-14F.

Figure 14A:
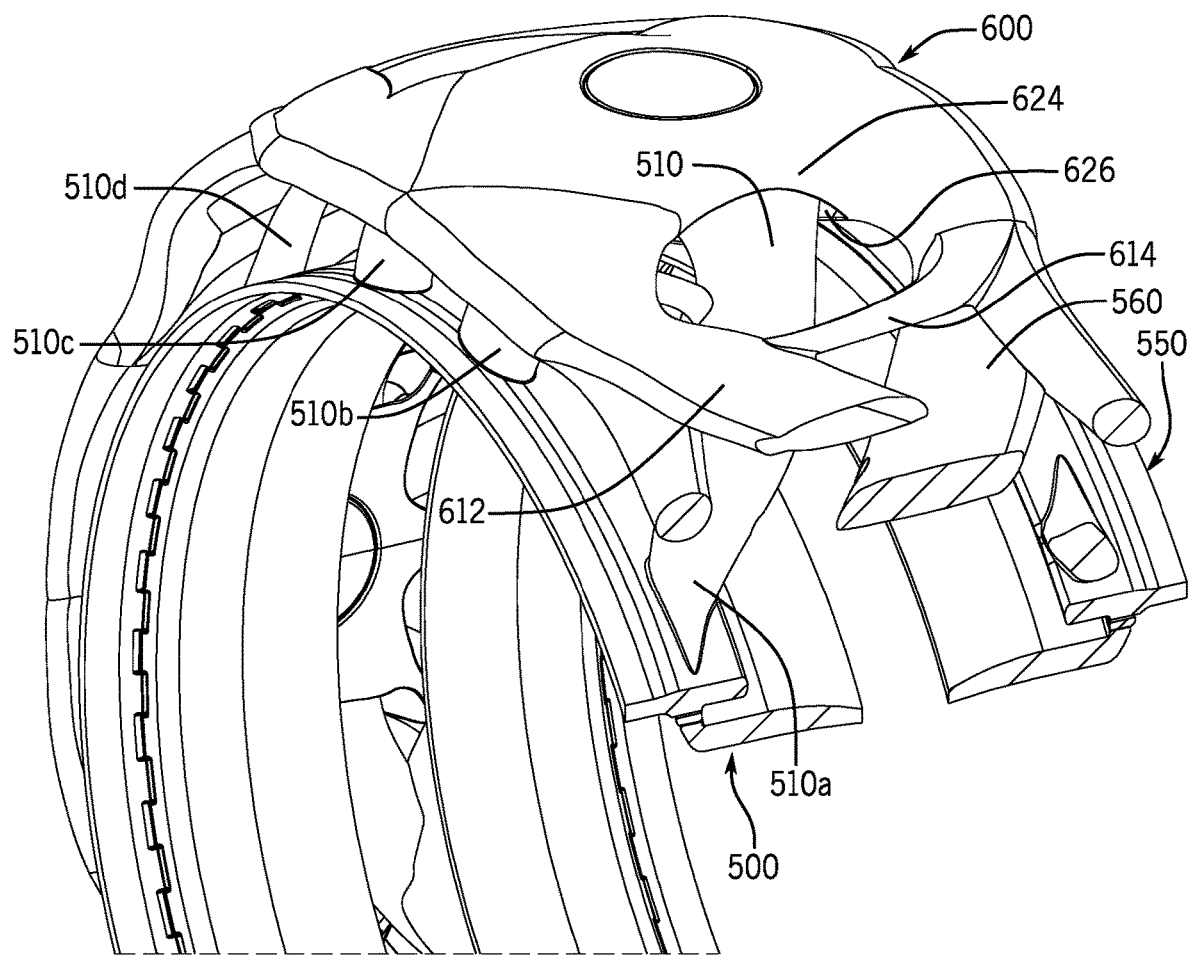
FIG. 14A is a cross-sectional perspective view of the example interlocking gimbal joint assembly, according to the embodiment of FIG. 11, taken along lines A-A and looking in the direction of the arrows.
Figure 14B:
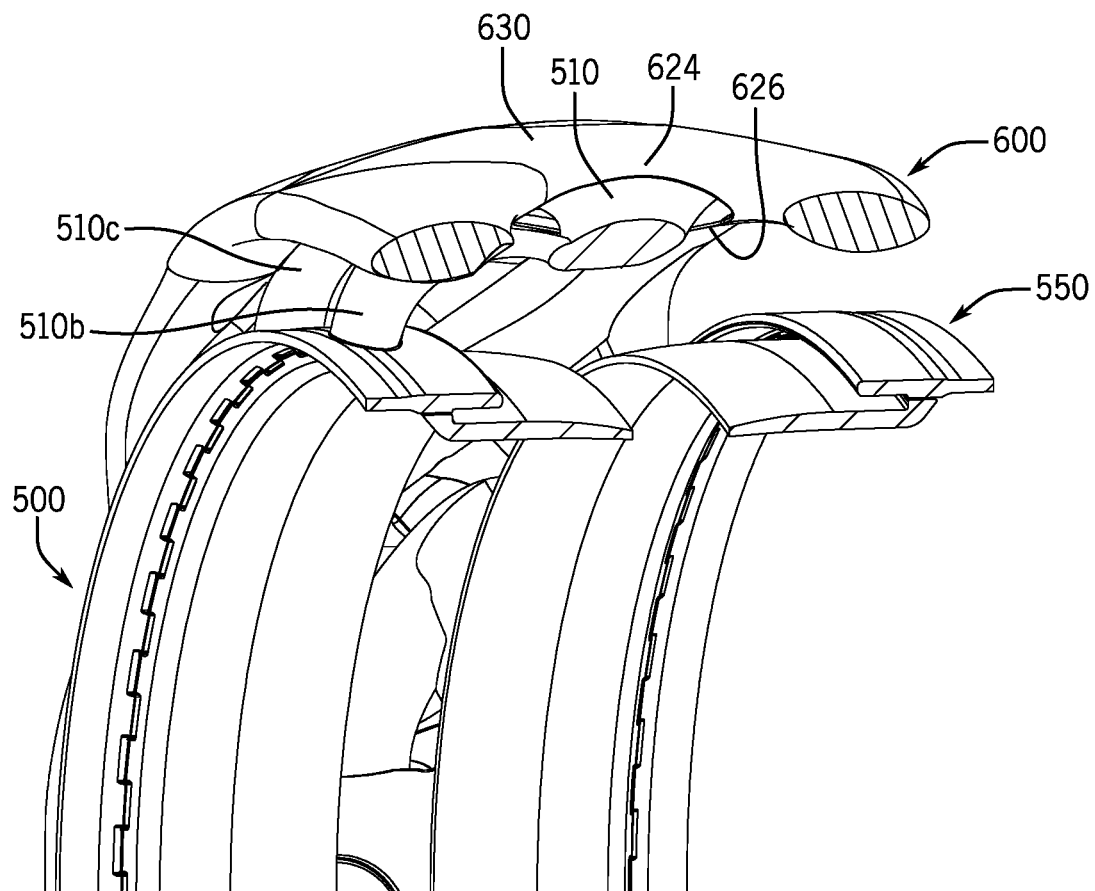
FIG. 14B is a cross-sectional perspective view of the example interlocking gimbal joint assembly, according to the embodiment of FIG. 11, taken along lines B-B and looking in the direction of the arrows.
Figure 14C:
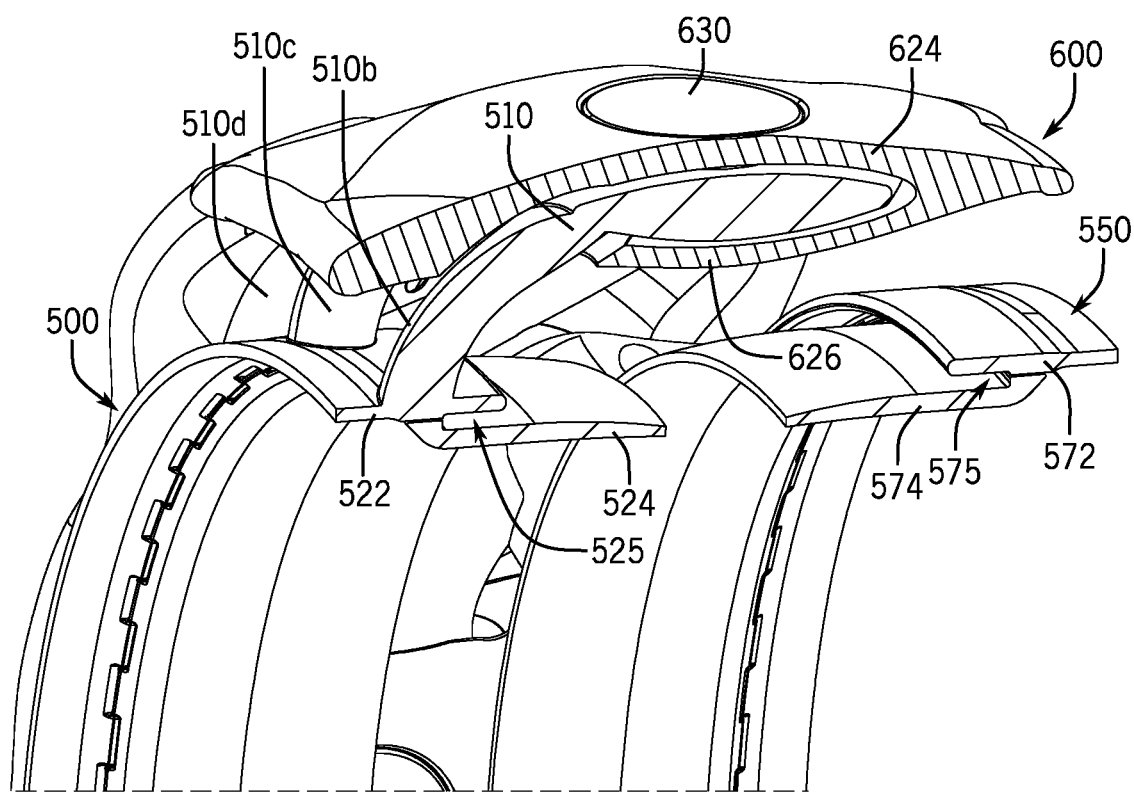
FIG. 14C is a cross-sectional perspective view of the example interlocking gimbal joint assembly, according to the embodiment of FIG. 11, taken along lines C-C and looking in the direction of the arrows.
Figure 14D:
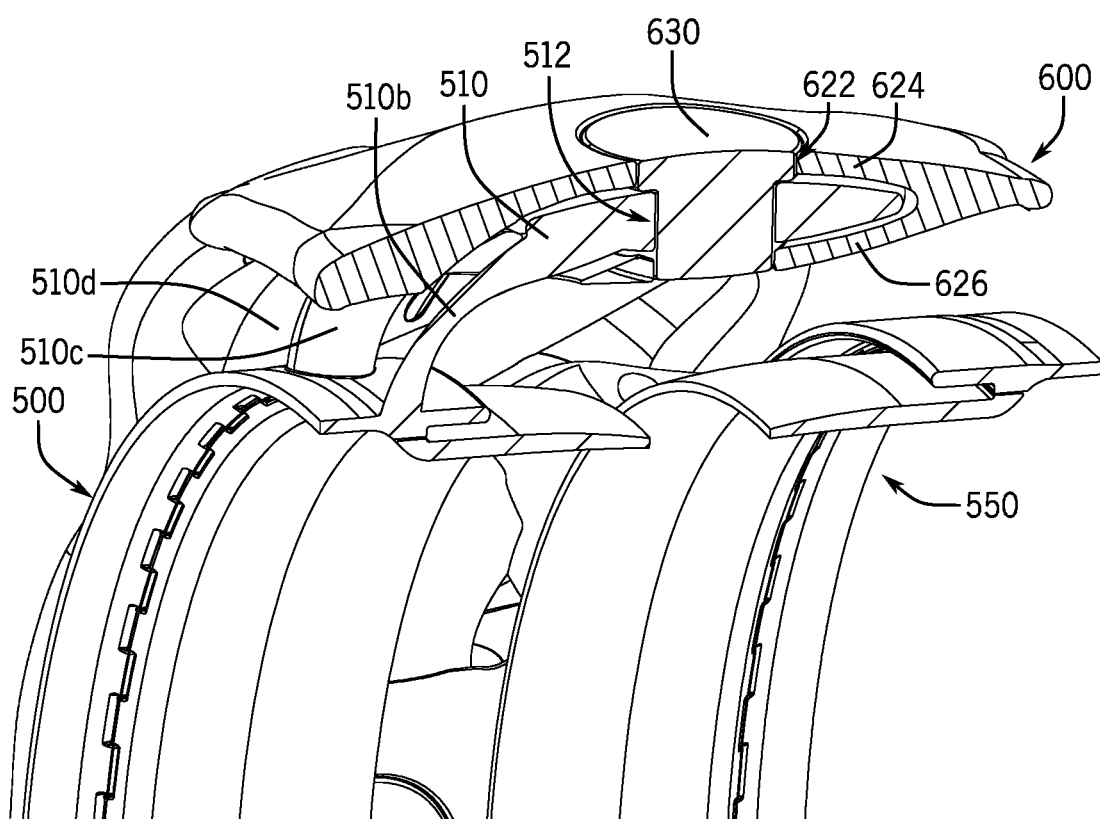
FIG. 14D is a cross-sectional perspective view of the example interlocking gimbal joint assembly, according to the embodiment of FIG. 11, taken along lines D-D and looking in the direction of the arrows.
Figure 14E:
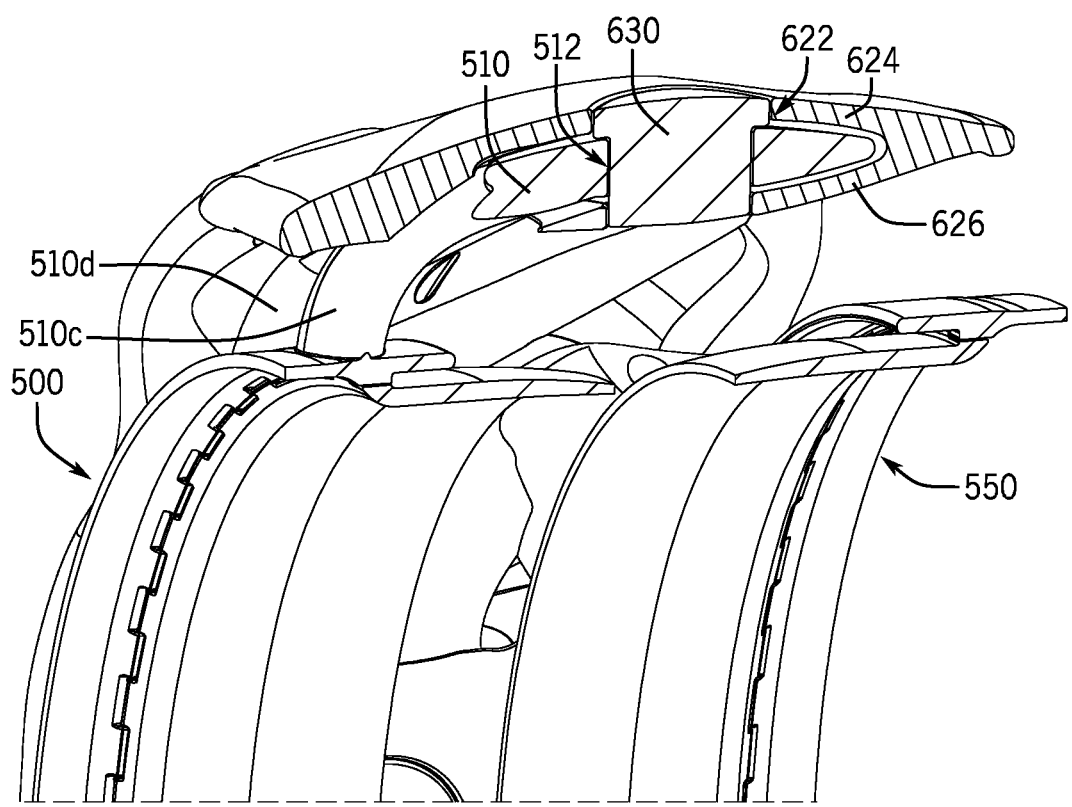
FIG. 14E is a cross-sectional perspective view of the example interlocking gimbal joint assembly, according to the embodiment of FIG. 11, taken along lines E-E and looking in the direction of the arrows.

The lower portion of the underhanging pocket structure of gimbal ring 600 also includes a bore hole that is aligned with bore hole 622 of gimbal ring 600 and bore hole 512 of first clevis 500 (see FIGS. 14C-E). In this arrangement, a pin (such as pin 630 or 640) extends through three bore holes, forming a "double shear" relationship that may resist shear forces more effectively compared to "single shear" gimbal joint designs, such as the gimbal joint design shown and described with respect to FIGS. 1A-7B.

Figure 12:
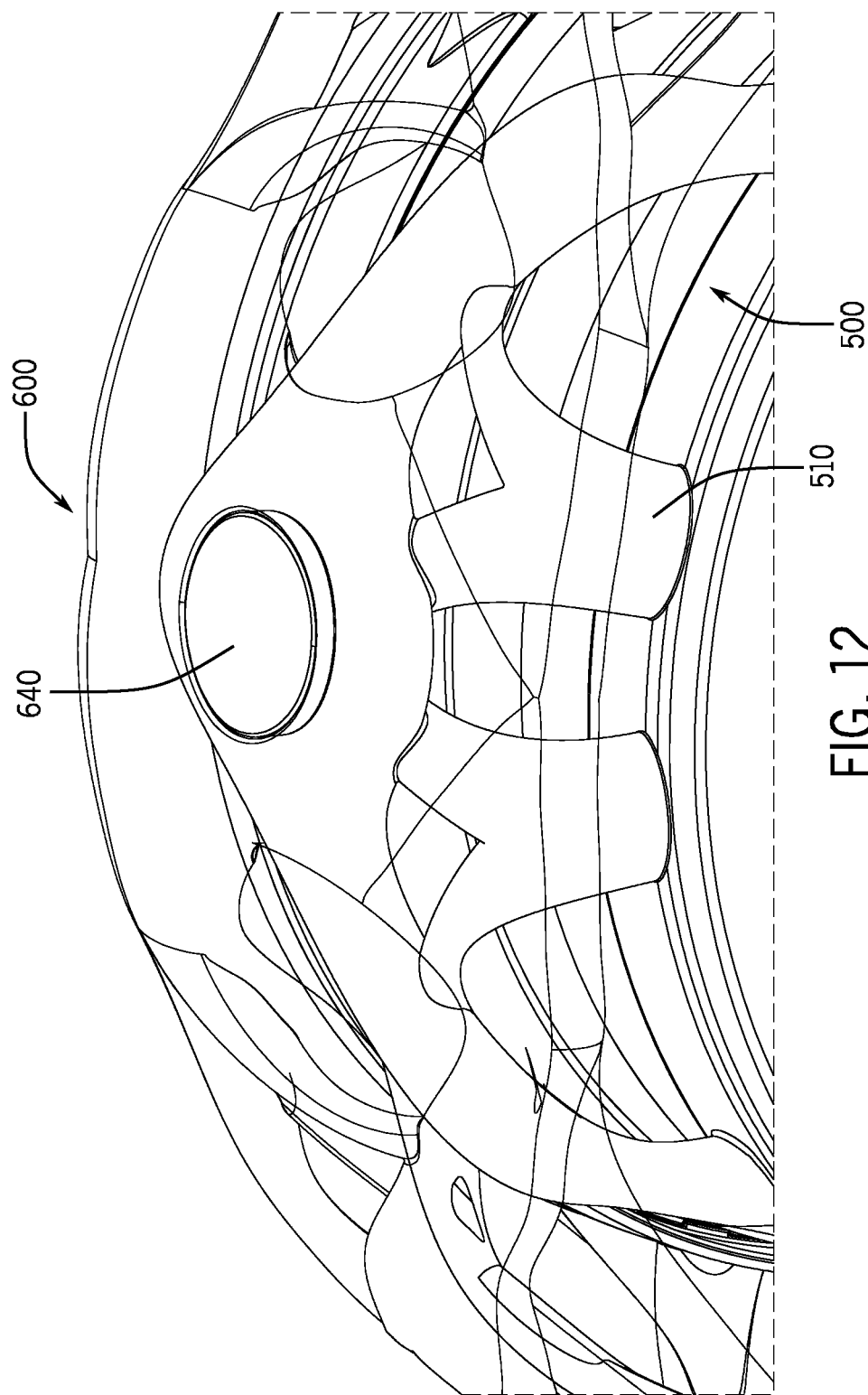
FIG. 12 is an enlarged front perspective phantom view of the example interlocking gimbal joint assembly, with a substantially transparent gimbal ring shown for explanatory purposes, according to the embodiment of FIG. 11.

FIG. 12 is a detailed perspective view showing an alternative pin 640 extending through bore holes of gimbal ring 600 and lobe 510. As with FIG. 11, gimbal ring 600 is shown as translucent for explanatory purposes only. Unlike pin 630, pin 640 includes a head that protrudes from and extends beyond the outer surface of gimbal ring 600.

Figure 13:
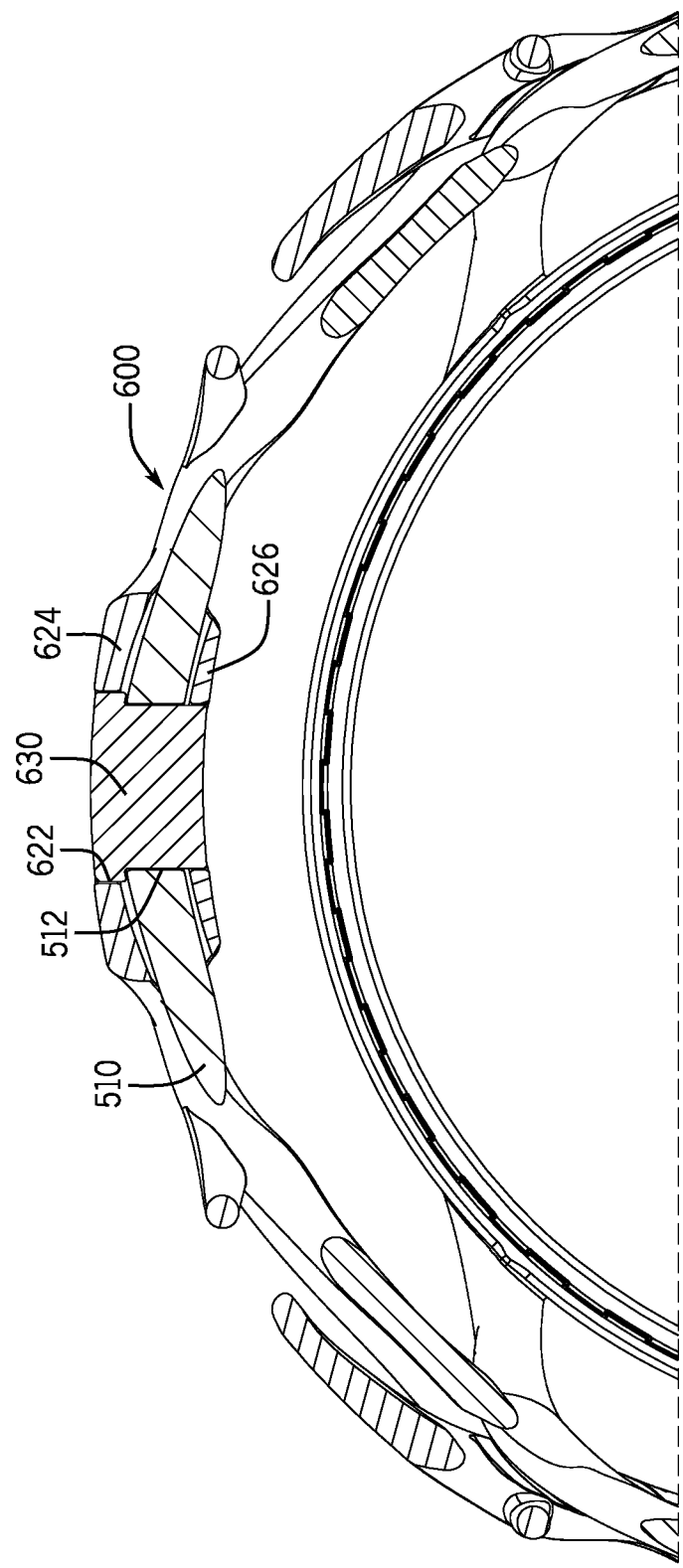
FIG. 13 is an elevated cross-sectional front view of the example interlocking gimbal joint assembly, according to the embodiment of FIG. 11, taken along lines 13-13 and looking in the direction of the arrows.

FIG. 13 is an elevated cross-sectional front view, taken along lines 13-13 in FIG. 11, showing lobe 510 positioned within the pocket formed between outer section 624 and inner section 626 of gimbal ring 600, and positioned about pin 630. As shown in FIG. 13, aligned bore holes extend through outer section 624 of gimbal ring 600, through lobe 510, and through bottom section 626 of gimbal ring 600. With pin 630 extending between these three aligned bore holes, first clevis 500 and gimbal ring 600 are coupled to each other in a "double shear" fashion that provides an increased resistance to shear forces.

FIGS. 14A-14E depict cutaway perspective views of the interlocking gimbal joint assembly, taken along different planes as defined by the dashed lines shown in FIG. 11. Multiple, successive cutaway views are shown to illustrate the relationship between gimbal ring 600, clevises 500 and 550, and the manner in which they "interlock" in a double-shear relationship.

FIG. 14A is a cutaway perspective view, taken along lines A-A in FIG. 11, showing lobe 510 extending from the annular portion of clevis 500 and into a "pocket" or cavity between outer section 624 and inner section 626 of gimbal ring 600. Notably, a clearance exists between gimbal ring 600 and lobe 510, such that the two components do not directly abut. As shown in FIG. 14A, lobe 510 includes extending portions 510a, 510b, 510c, and 510d, which are integrally formed with and extend from the annular shroud portion of clevis 500.

FIG. 14B is a cutaway perspective view, taken along lines B-B in FIG. 11, showing lobe 510 positioned within the pocket or cavity formed between outer section 624 and underhanging inner section 626 of gimbal ring 600. As shown in FIG. 14B, lobe 510 initially extends underneath gimbal ring 600, and a portion of lobe 510 extends through the pocket or cavity defined by outer section 624 and inner section 626.

FIG. 14C is a cutaway perspective view, taken along lines C-C in FIG. 11, showing lobe 510 positioned within the C-shaped pocket formed between outer section 624 and underhanging inner section 626 of gimbal ring 600. As shown in FIG. 14C, outer section 624 and inner section 626 are integrally formed as a part of gimbal ring 600. The space between outer section 624 and inner section 626 may be shaped to substantially reflect the shape of lobe 510, to enhance the shear force resistance provided in the double-shear arrangement.

FIG. 14D is a cutaway perspective view, taken along lines D-D in FIG. 11 (substantially adjacent to lines C-C and intersecting pin 630), which also shows lobe 510 positioned within the C-shaped pocket formed between outer section 624 and underhanging inner section 626 of gimbal ring 600. As shown in FIG. 14D, pin 630 extends through bore holes of outer section 624, lobe 510, and inner section 626. In this configuration, upper section 624 and inner section 626 act as outer and inner gimbal rings, respectively, providing structural integrity and a substantial resistance to shear forces.

FIG. 14E is a cutaway perspective view, taken along lines E-E in FIG. 11 (substantially bisecting pin 630), which shows extending portion 510c of lobe 510 extending from the annular shroud portion of clevis 500 and into the pocket or cavity formed between outer section 624 and inner section 626 of gimbal ring 600. Similar to FIG. 14D, FIG. 14E shows the double-shear relationship formed by pin 630 extending through aligned bore holes of outer section 624, lobe 510, and inner section 626.

Figure 10:
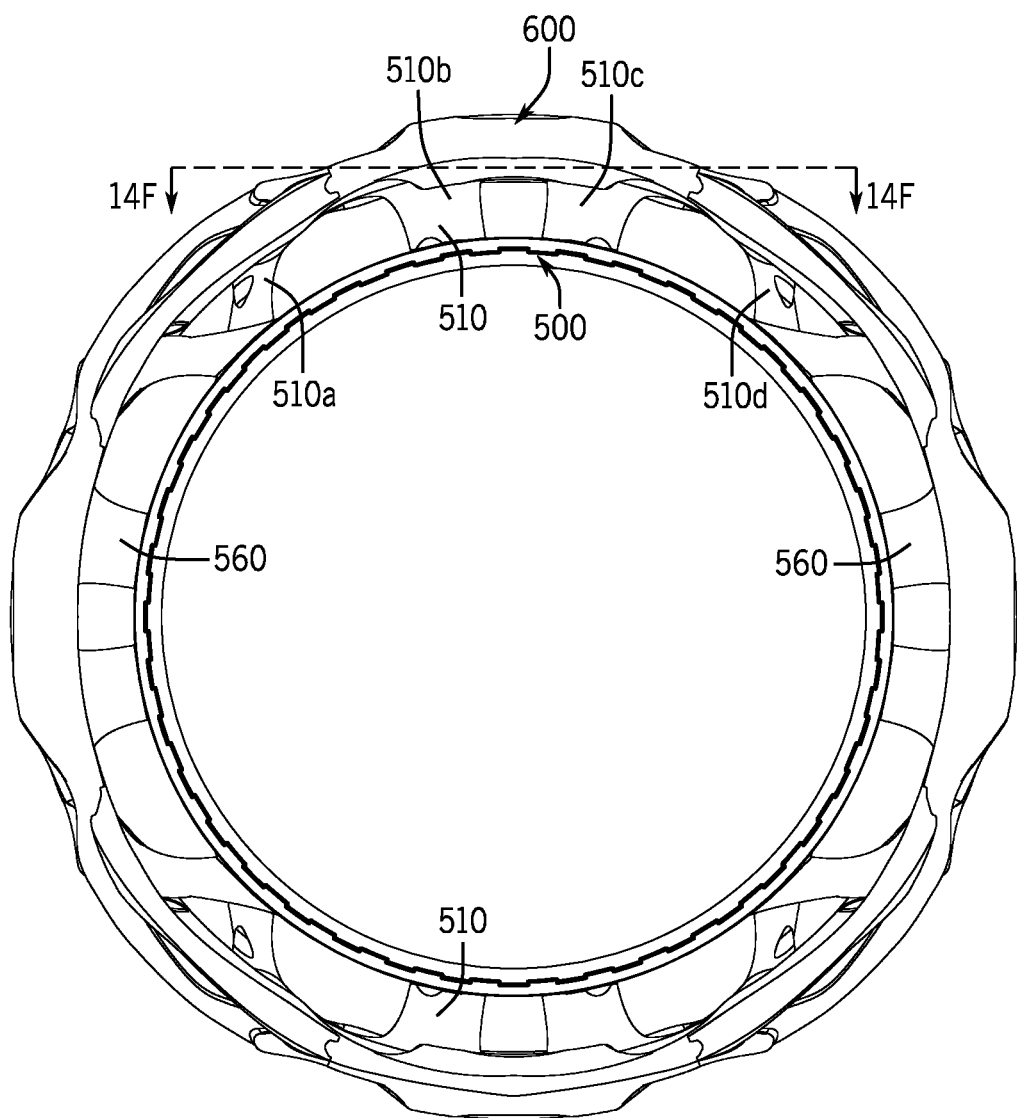
FIG. 10 is an elevated front view of the example interlocking gimbal joint assembly, according to the embodiment of FIG. 8.
Figure 14F:
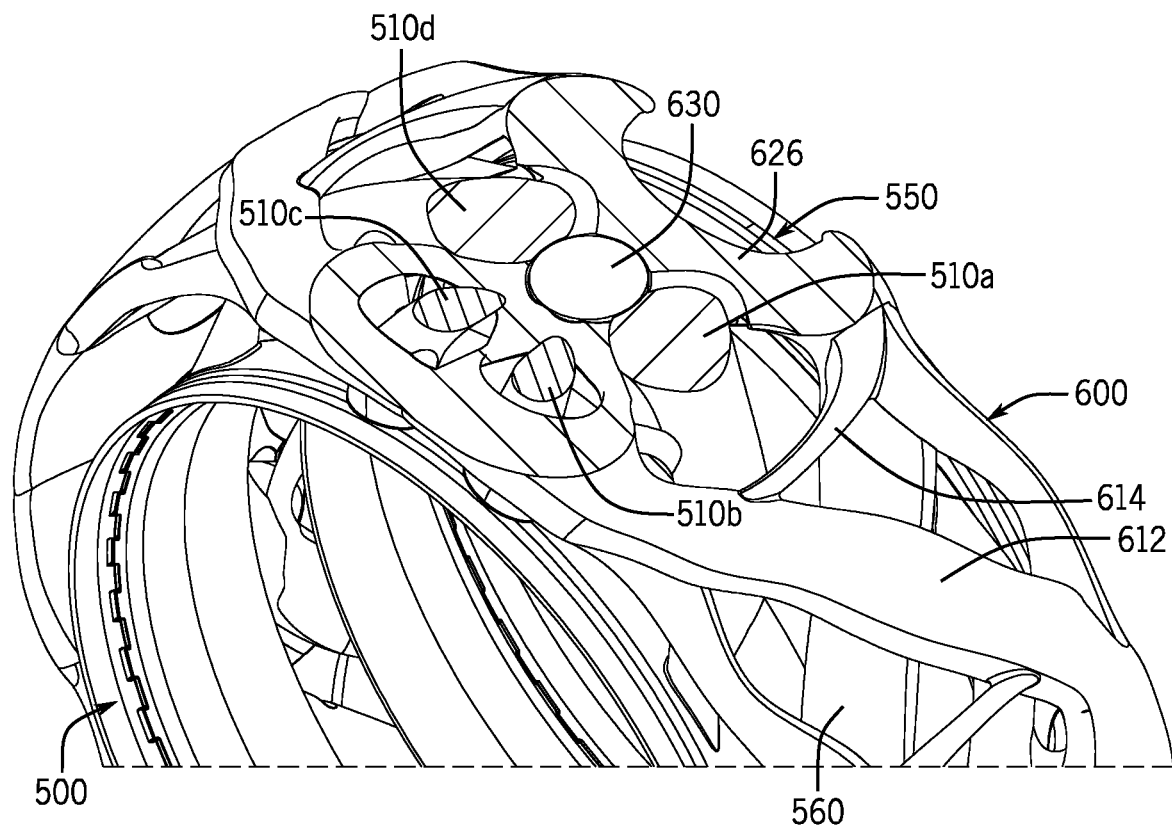
FIG. 14F is a cross-sectional perspective view of the example interlocking gimbal joint assembly, according to the embodiment of FIG. 10, taken along lines F-F and looking in the direction of the arrows.

FIG. 14F is a cutaway perspective view, taken along lines F-F in FIG. 10, which illustrates the manner in which each extending portion 510a, 510b, 510c, and 510d of lobe 510 passes through the pocket or cavity formed within gimbal ring 600. As shown in FIG. 14F, extending portions 510b and 510c project through substantially circular gaps formed within gimbal right 600, and extend toward (and eventually converge with) extending portions 510a and 510d, respectively. The interwoven and tightly compacted geometries of clevis 500, clevis 550, and gimbal ring 600 may be formed using additive manufacturing techniques.

As with the example embodiments shown and described above with respect to FIGS. 1A-7B, components of the interlocking gimbal joint assembly embodiment, such as clevises 500 and 550 and gimbal ring 600, may be geometrically and/or topologically optimized to balance the structural integrity of the gimbal joint assembly with the weight of the gimbal joint assembly. Some example optimization techniques are described in greater detail below.

Figure 15A:
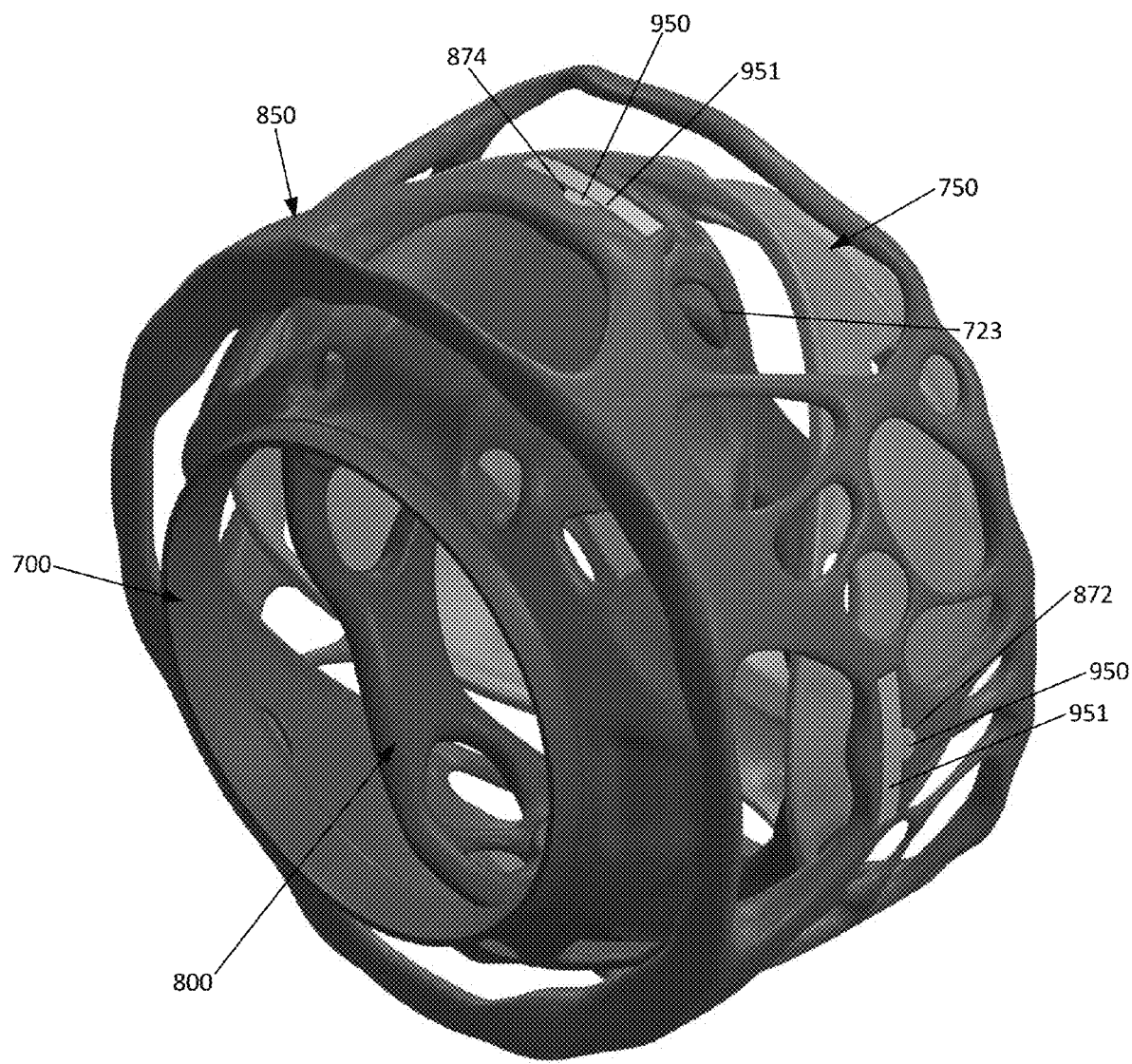
FIG. 15A is a perspective view of another embodiment of the gimbal joint assembly of the present invention, in which the gimbal ring comprises two gimbal rings—an inner gimbal ring positioned within the two clevises and an outer gimbal ring positioned about the two clevises.
Figure 15B:
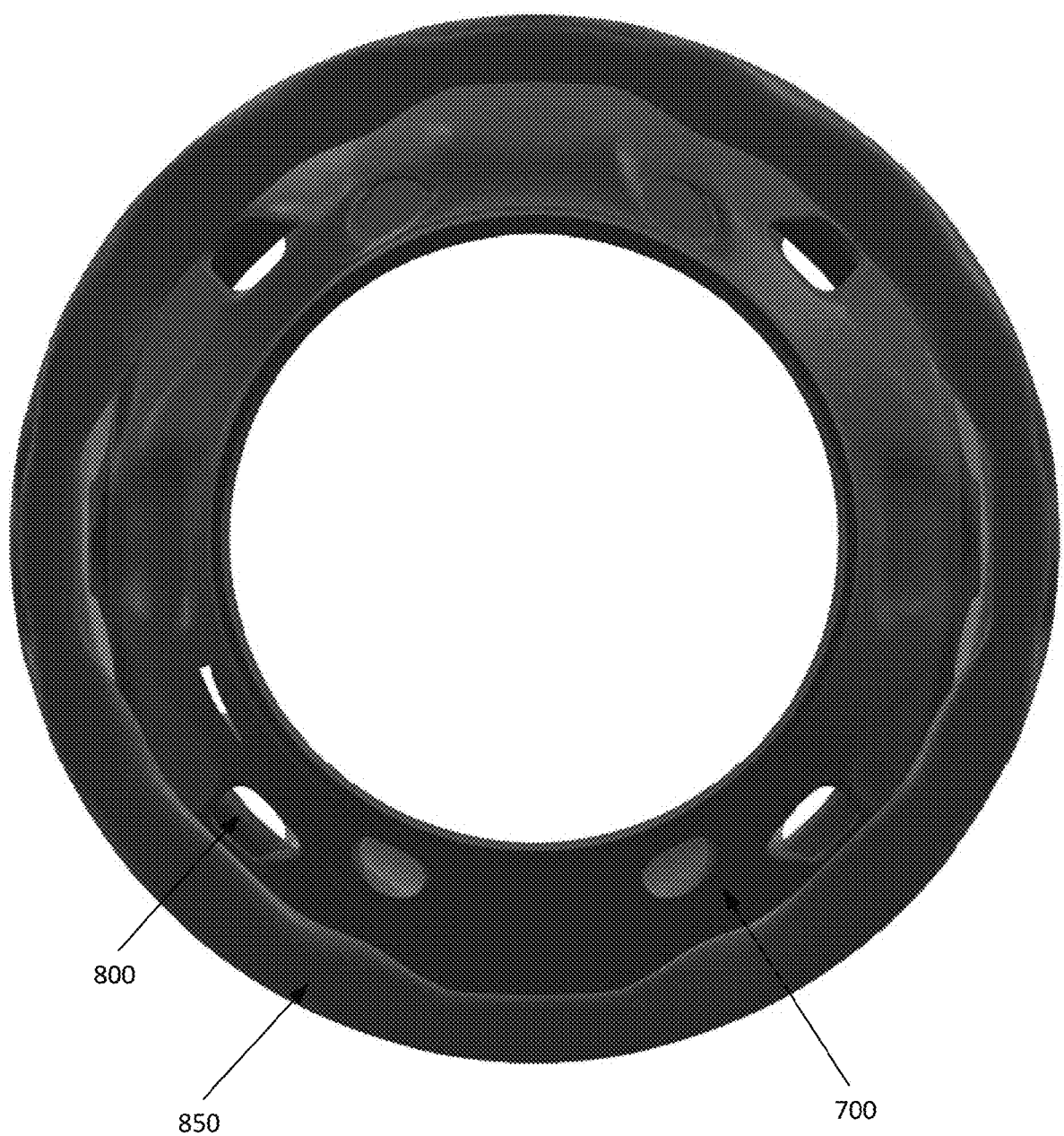
FIG. 15B is an elevated front view of the example gimbal joint assembly, according to FIG. 15A.

FIGS. 15A-21 depict an alternative embodiment of a gimbal joint assembly, also comprising a "shear web" gimbal joint design. Similar to the embodiment shown and described above as the interlocking gimbal joint assembly with respect to FIGS. 1-7B, the alternative shear web gimbal joint assembly of FIGS. 15A-21 includes a pair of clevises (first clevis 700 and second clevis 750). However, in contrast to the initial assembly, the alternative shear web gimbal joint assembly includes a gimbal ring comprising at least two gimbal ring components: an inner gimbal ring 800 and an outer gimbal ring 850. As shown in FIG. 15, outer ring 850 is disposed about first clevis 700 and second clevis 750, while inner ring 800 is disposed within first clevis 700 and second clevis 750.

By including at least two separate gimbal ring components in the single joint, the alternative gimbal joint assembly provides increased support relative to a design incorporating only a single gimbal ring component. For example, the inner and outer gimbal ring components function analogously to overlapping struts 212 and 214 of the embodiment shown in FIGS. 1-7A. but they do so while maintaining a substantially flat surface from a radial perspective. Put differently, the combination of the two gimbal ring components enables the present shear web gimbal joint assembly to better resist shear forces. This is accomplished, in part, by structuring inner ring 800 and outer ring 850 to have similar stiffness in the axial direction (i.e., in the direction that fluid would be flowing through the gimbal joint), such that each of inner ring 800 and outer ring 850 respond similarly to applied forces (e.g., tension, compression, shear). This similar stiffness may be based on each of inner ring 800 and outer ring 850 having similar stiffness properties, which include but are not limited to elasticity, malleability, flexibility, etc., and may be achieved in large part by the specific orientation of struts and supports that comprise inner ring 800 and outer ring 850. As discussed in depth herein, these struts and supports may be implicitly formed by the "optimized" placement and/or the removal (or omission) of material in the manufacturing process, thereby resulting in gaps or apertures in the gimbal ring components. The particular pattern of struts may result in the paired structural rings overlapping in the radial orientation.

In addition to improving the overall shear resistance of the entire assembly, the separate gimbal ring components improve fastener retention (i.e., keeping connecting pins inserted), as the at least two gimbal ring components make it more difficult for connecting pins 950 to inadvertently pop out or be jostled free during use. A bushing (e.g., bushing 952) may also be included about connecting pin 950 in order to improve retention by reducing jostling within the channel, and by lessening friction at the bearing surface by utilizing dissimilar material contact. The bushing may be included within first clevis 700 and/or second clevis 750, or may be included or placed during assembly. To this end, connecting pins 950 may further include one or more retainment features, which include a retainment tab configured to project substantially perpendicularly to the length of connecting pin 950 and to interact with a slot on one of the components through which connecting pin 950 passes (e.g., first clevis 700, second clevis 750, inner ring 800, and/or outer ring 850). The interaction of the retainment tab with the slot prevents movement of the connecting pin. The retainment features may also include a cover 951 that is placed over connecting pin 950 when connecting pin 950 is inserted. The cover 951 may be placed on outer ring 850 side of the connecting pin, and prevents connecting pin 950 from moving outwardly relative to outer ring 850. Cover 951 may slot into a recession in outer ring 851 to reduce the overall external geometric envelope.

The multiple (inner and outer) gimbal ring components also serve to more evenly distribute the force exerted upon connecting pins 950 because supporting force provided by the single ring at a single point of contact is instead provided by two ring components at two points of contact, which roughly halves the shear force on connecting pin 950 at any single point of contact. This, in turn, enables the use of connecting pins with smaller diameters, which lowers the friction coefficient for gimbal movement.

The multiple gimbal ring components also improve the safety of the shear web gimbal joint assembly by introducing a degree of redundancy in event of failure of connecting pins and/or one of the gimbal ring components, as the remaining gimbal ring component can still substantially function on its own. Furthermore, the separate gimbal ring components provide an ease of assembly, as compared to overlapping struts, partly due to the relative simplicity of the parts but also due to the separate ring components being able to be installed at different stages of the assembly process.

Figure 16A:
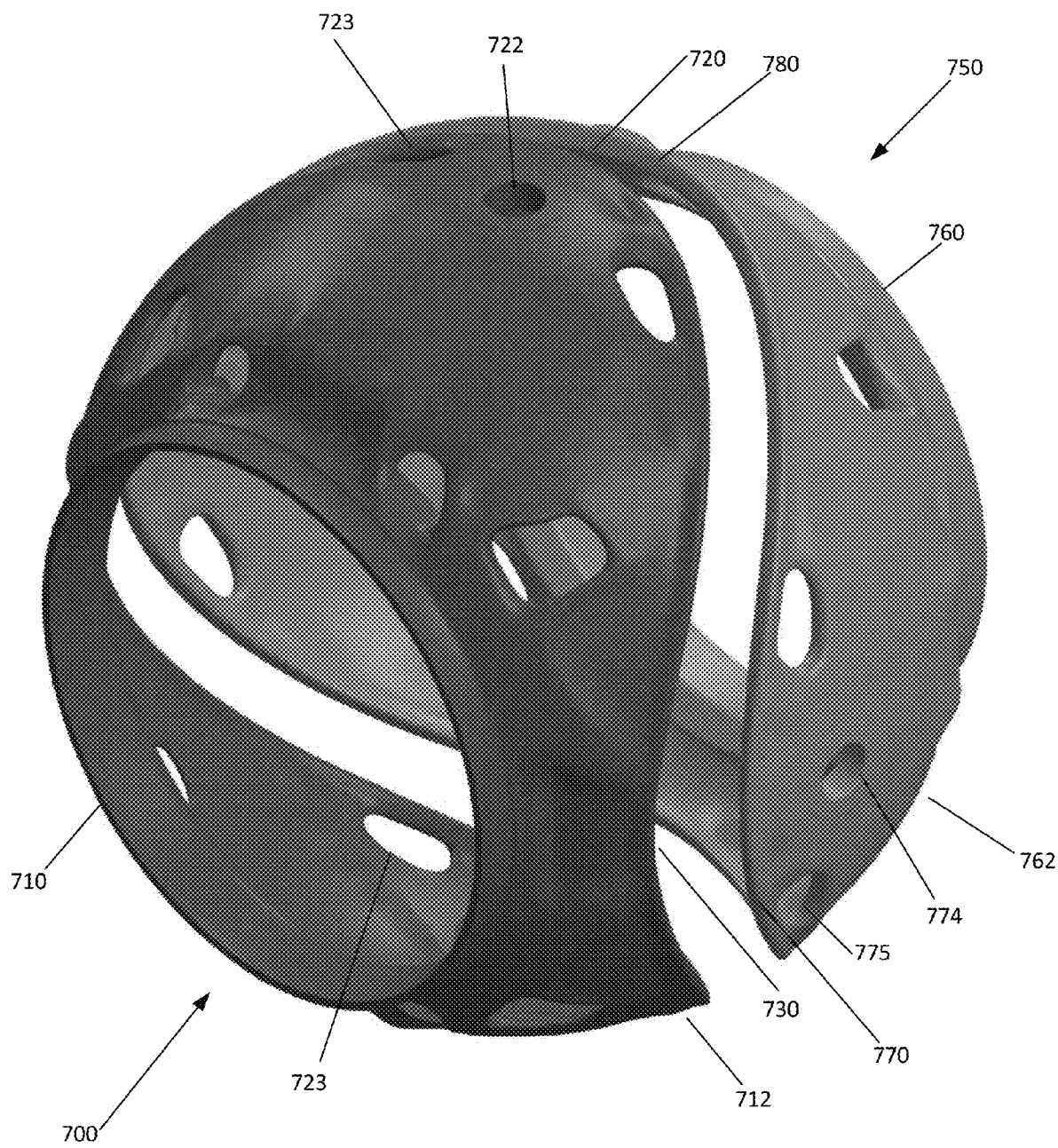
FIG. 16A is a perspective view of the two detached clevises of the example gimbal joint assembly, according to the embodiment of FIG. 15A.
Figure 16B:
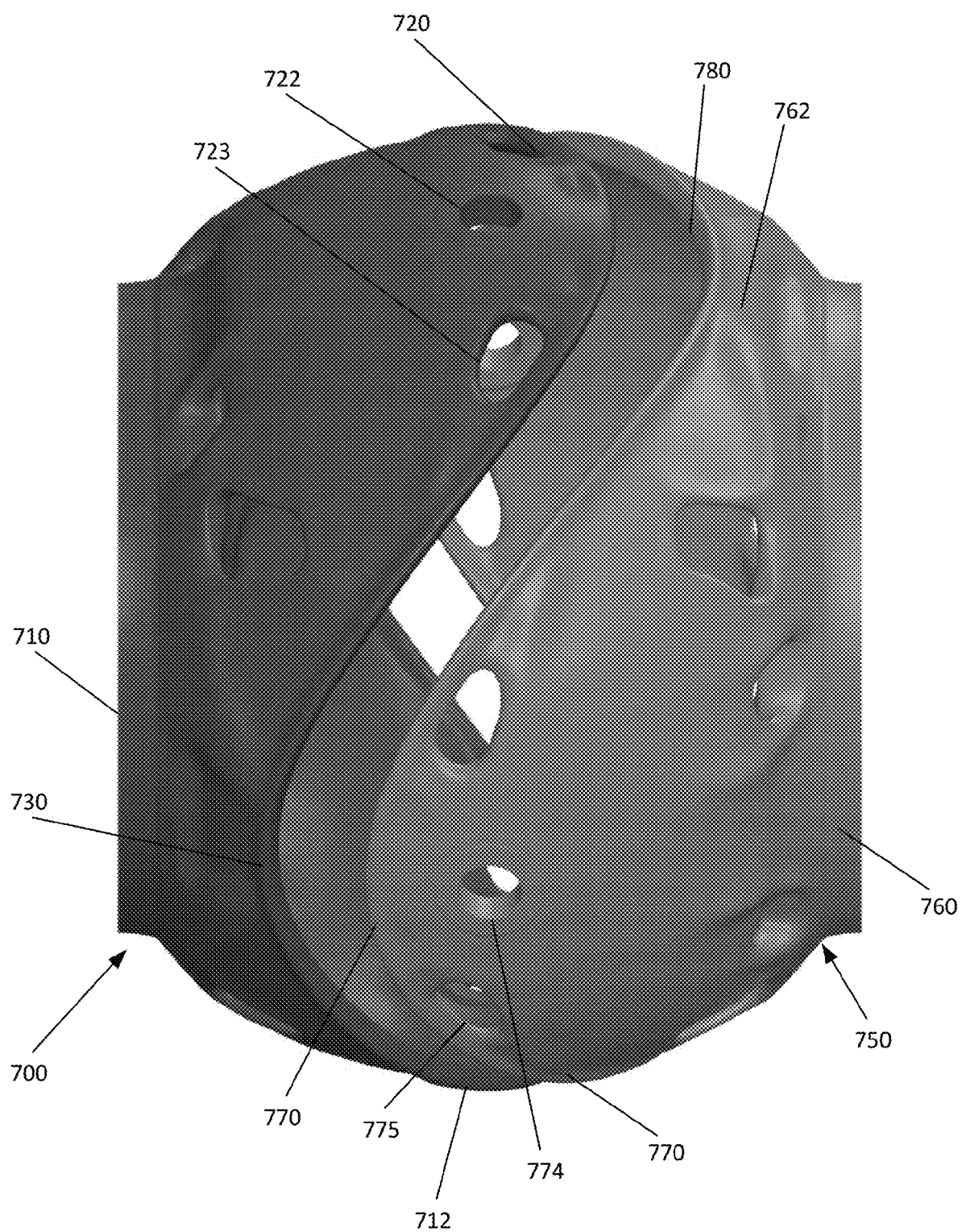
FIG. 16B is an elevated side view of the two clevises of the example gimbal joint assembly, according to the embodiment of FIG. 15A.

FIG. 16A depicts a perspective view of first clevis 700 and the second clevis 750 without the other components of the alternative shear web gimbal joint assembly. First clevis 700 includes a substantially annular shroud with distal section 710 and proximal section 712 that is integrally formed with distal section 710. Distal section 710 is sized and shaped in order to permit distal section 710 to be fitted about an adjoining pipe or duct. Proximal section 712 is shown to include a pair of protrusions 720 and a pair of recessions 730. As shown, the pair of protrusions 720 are substantially rounded portions of first clevis 700 that, when the alternative shear web gimbal joint assembly is in its assembled state, extend and protrude axially towards second clevis 750. Each of the pair of protrusions 720 include bore hole 722, which aligns with a respective bore hole 822 in inner ring 800 and a respective bore hole 872 in outer ring 850. In some embodiments, the clevises are structured as relatively thicker struts that are connected by relatively thinner membrane regions. In contrast to the structure of inner ring 800 and outer ring 850, the structure of the thinner membrane further restricts movement of the thicker struts. The clevises may additionally include relatively independent struts, which are separated by hollow sections (i.e., gaps) rather than connected by thinner membranes.

Each protrusion 720 may further include one or more gaps 723, in which a substantial amount of material is specifically positioned to form each protrusion 720 and specifically omitted to form one or more gaps 723, during the formation of first clevis 700. As discussed above, the components of the joint assembly may be optimized to be able to withstand significant shear forces, while also reducing their mass. While first clevis 700 could be formed as a solid, bulk structure without any gaps or omissions of material, this would not result in an optimized first clevis 700 having a reduced mass. Thus, first clevis 700 is formed in an optimized manner to include, through the specific placement of material at locations such as protrusion 720, as well as to include, through the specific omission of material, gaps 723, which are configured (when first clevis 700 is compared to an equivalent solid, bulk structure) to reduce the mass or to increase the stiffness of first clevis 700—or both. In the example shown in FIG. 16, each protrusion 720 has two gaps 723. First clevis 700 may include additional gaps, each of which is structured to reduce the overall weight and mass of first clevis 700 without weakening the structural integrity thereof. The combination of gaps 723 and material used to form each protrusion 720 may form a "shear web," such that the interconnected material forms a network of struts, trusses, and/or gussets capable of preventing deformation when subjected to a load, but at a reduced weight—as compared to a solid, non-gapped clevis structure. Furthermore, gaps 723 improve the overall durability of first clevis 700 by reducing vibration and increasing flexibility, which enables first clevis 700 to withstand more rigors of use. Particularly in those embodiments in which the alternative shear web gimbal joint assembly is used to transfer hot or heated fluids, gaps 723 improve the heat transfer properties of the alternative shear web gimbal joint assembly by exposing more of the underlying surface area (e.g., of the bellows), which exposure increases heat dissipation. In some implementations, the size, shape, location, and distribution of gaps 723 may be determined or modified, via geometric optimization and/or topological optimization. The size, shape, location, and distribution of gaps 723 may further depend on envelope constraints, the mechanical strength of the material, overall stiffness requirements, and resolution limitations of the manufacturing process.

Second clevis 750 may be similar to or the same as first clevis 700. Like first clevis 700, second clevis 750 includes distal section 762 and proximal section 760. Distal section 762 includes a pair of protrusions 770 and a pair of recessions 780. Each protrusion further includes a bore hole 774, which aligns with a respective bore hole 824 in inner ring 800 and a respective bore hole 874 in the outer ring 850. When the alternative shear web gimbal joint assembly is in its assembled state, each protrusion 720 of the first clevis slots substantially within each recession 780 of the second clevis, and each protrusion 770 of the second clevis slots substantially within each recession 730 of the first clevis. In this way, when assembled, each bore hole 722 of the first clevis is spaced approximately 90° from each bore hole 774 of the second clevis.

First clevis 700 and second clevis 750 may be oriented so as to align bore holes 722 and 774 of protrusions 720 and 770, respectively, to bore holes 822 and 824 formed within inner ring 800 and bore holes 872 and 874 formed within outer ring 850. Pins, lugs, or other connectors may be placed through aligned bore holes 722, 774, 822, 824, 872, and 874, which may subsequently be welded, brazed, sintered or otherwise held in place to couple each of first clevis 700 and second clevis 750 to inner ring 800 and outer ring 850. In this arrangement, first clevis 700 and inner ring 800/outer ring 850 form a revolute joint that enables first clevis 700 to deflect angularly about an axis that extends through bore holes 722 of first clevis 700. Likewise, second clevis 750 and inner ring 800/outer ring 850 form a revolute joint that enables second clevis 750 to deflect angularly about a different axis that extends through bore holes 774 of second clevis 750. In this manner, second clevis 750 may be angularly deflected in two degrees of freedom relative to first clevis 700. When the alternative shear web gimbal joint assembly is in its assembled state, a certain amount of space is left between first clevis 700 and second clevis 750. This certain amount of space may vary based on the application and particular embodiment, but is defined by the maximum designed angulation or the maximum freedom of movement that the combination of each clevis 700 and 750 is afforded. Put differently, the certain amount of space is set such that the leading edge of first clevis 700 makes contact with the leading edge of second clevis 750 when the combination of both clevises has reached its maximum angulation. In this way, when bellows are included, the bellows (e.g., bellows 900) are protected from over-angulation by the maximum angulation limit of first clevis 700 and second clevis 750.

In some embodiments, first clevis 700 and second clevis 750 are differently sized such that one clevis is able to rotate or move within the other clevis. For example, first clevis 700 may be smaller than second clevis 750. In these embodiments, because the clevises would not impact each other when reaching the maximum designed angulation, each clevis would have increased range of motion. However, when a bellows is included, the bellows would not be protected from over-angulation without additional higher assembly consideration.

Figure 17:
FIG. 17 is a perspective view of the inner gimbal ring of the example gimbal joint assembly, according to the embodiment of FIG. 15A.

Referring to FIG. 17, inner gimbal ring 800 is a substantially annular structure that includes bore holes 822 and 824. In the particular implementation shown in FIG. 17, bore holes 822 are circumferentially spaced 90° away from bore holes 824, such that each bore hole (either 822 or 824) is approximately 90° away from another bore hole (either 822 or 824). These bore holes 822 and 824 may include additional structures (e.g., a retaining lip) that serve to retain the connecting pins. Inner ring 800 may also include one or more gaps 826 disposed near or about the bore holes 822 and 824. In the example shown in FIG. 17, there are four gaps 826 about each bore hole 822 and 824. In some embodiments, inner ring 800 is structured as several struts that merge with interfacing features, and include higher strength struts around the circumference. In this way, the struts overlap in both the axial and circumferential orientations within the component itself.

Figure 18:
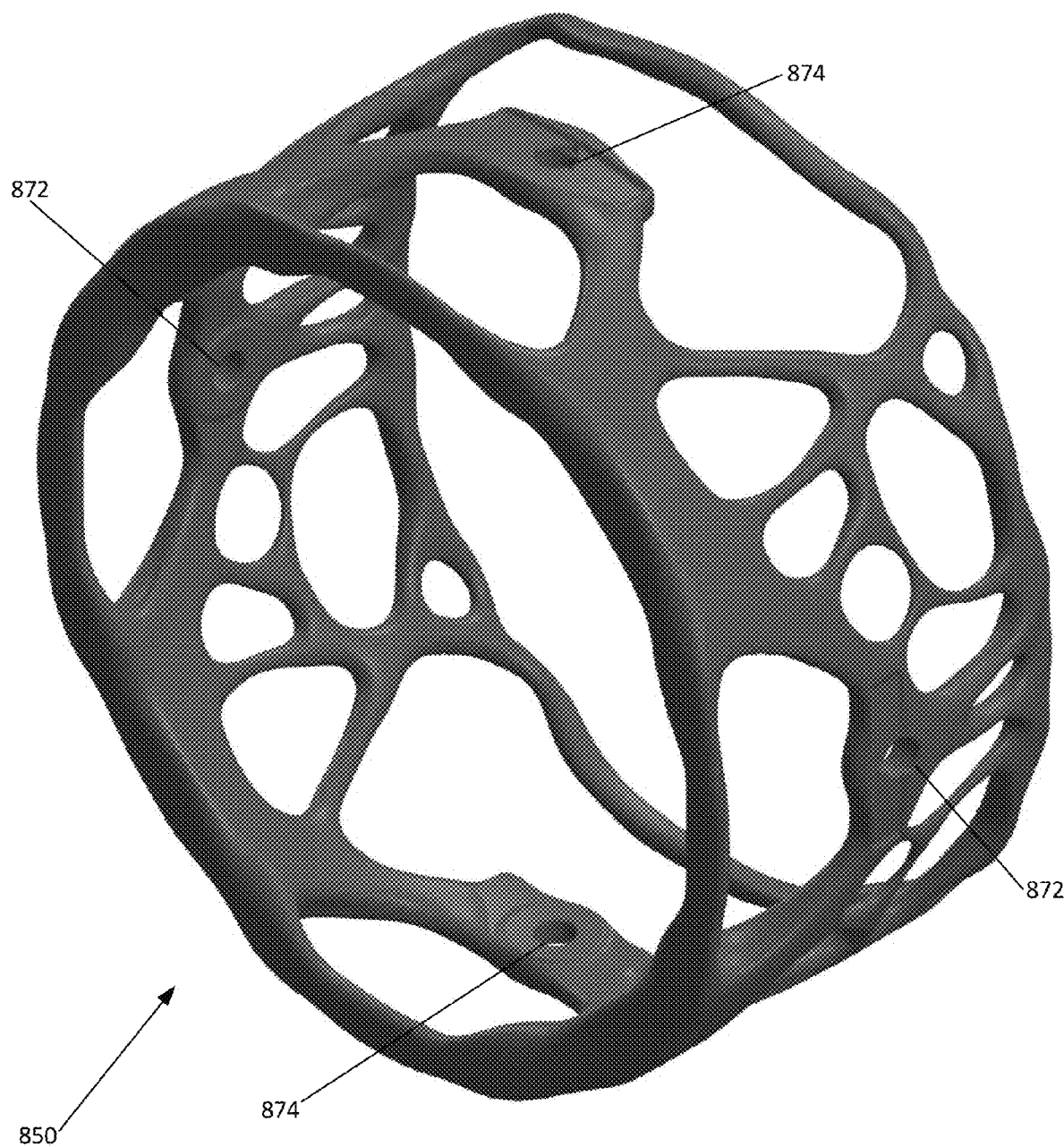
FIG. 18 is a perspective view of the outer gimbal ring of the example gimbal joint assembly, according to the embodiment of FIG. 15A.

Referring to FIG. 18, similar to inner gimbal ring component 800, outer gimbal ring component 850 is a substantially annular structure that includes bore holes 872 and 874. In the particular implementation shown in FIG. 18, bore holes 872 are circumferentially spaced 90° away from the bore holes 874, such that each bore hole (either 872 or 874) is approximately 90° away from another bore hole (either 872 or 874). Outer ring component 850 may also include one or more gaps disposed throughout outer ring component 850. In fact, as shown in FIG. 18, the majority of outer ring component 850 may be comprised of such gaps or such omissions of material deposited through the additive manufacturing process. In this way, outer ring component 850 may provide substantial reinforcement and support for the alternative shear web gimbal joint assembly, while simultaneously reducing the overall weight and mass that may be added to the joint assembly through the addition of a second gimbal ring component. In some embodiments, outer ring component 850 is structured as several struts that merge with interfacing features, and have higher strength struts around the circumference of the outer ring component. In this way, the struts overlap in both the axial and circumferential orientations within the outer ring component itself.

For each of first clevis 700, second clevis 750, inner ring 800, and outer ring 850, the series of gaps and the additively-deposited material essentially results in a plurality of struts that are integrally formed with each other across each of first clevis 700, second clevis 750, inner ring 800, and outer ring 850. Collectively, the plurality of struts may form an interconnected shear web of trusses, struts and/or other reinforcements that provides comparable or improved structural compliance, but with less material and at a lower weight relative to traditional solid and continuous gimbal ring joint components. Furthermore, by structuring each of first clevis 700, second clevis 750, inner ring 800, and outer ring 850 to include gaps rather than discrete struts or connectors, each is able to be manufactured (e.g., additively manufactured) as a single piece part without further processing or assembly.

Figure 19:
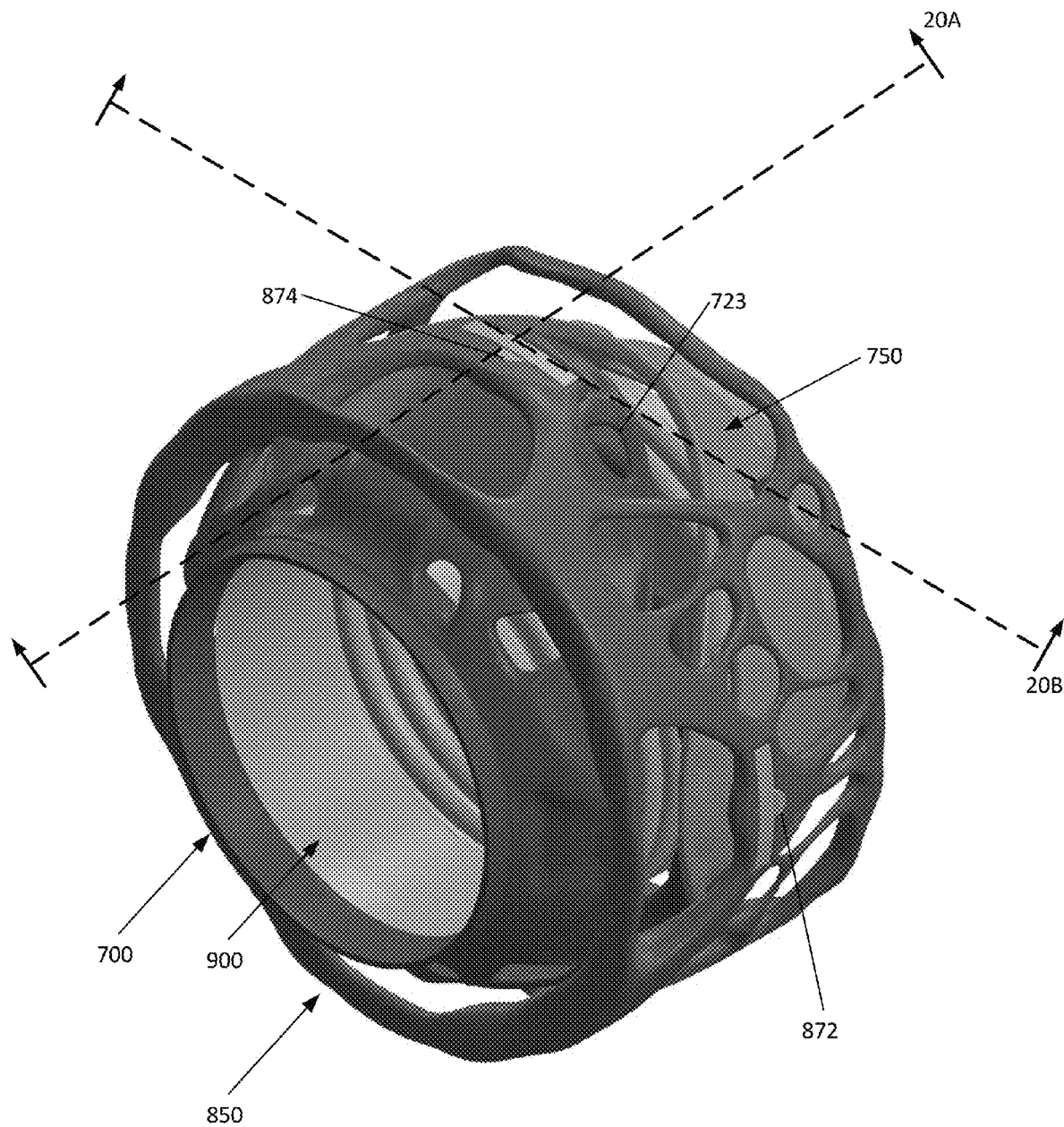
FIG. 19 is a perspective view of the example gimbal joint assembly with integrated bellows, according to the embodiment of FIG. 15A.

As shown in FIG. 19, the alternative shear web gimbal joint assembly may optionally include bellows 900, which may be welded, brazed, sintered or otherwise sealedly joined to first clevis 700 and second clevis 750. In the state shown in FIG. 19, the inner surfaces of first clevis 700, second clevis 750, and bellows 900 form a fluid-tight gas passage adapted for use in high temperature and high pressure environments, such as in bleed air systems for jet engine aircrafts. However, as shown in FIG. 15A, the alternative shear web gimbal joint assembly may be used without bellows 900, such as to provide a conduit for cables.

Figure 20A:
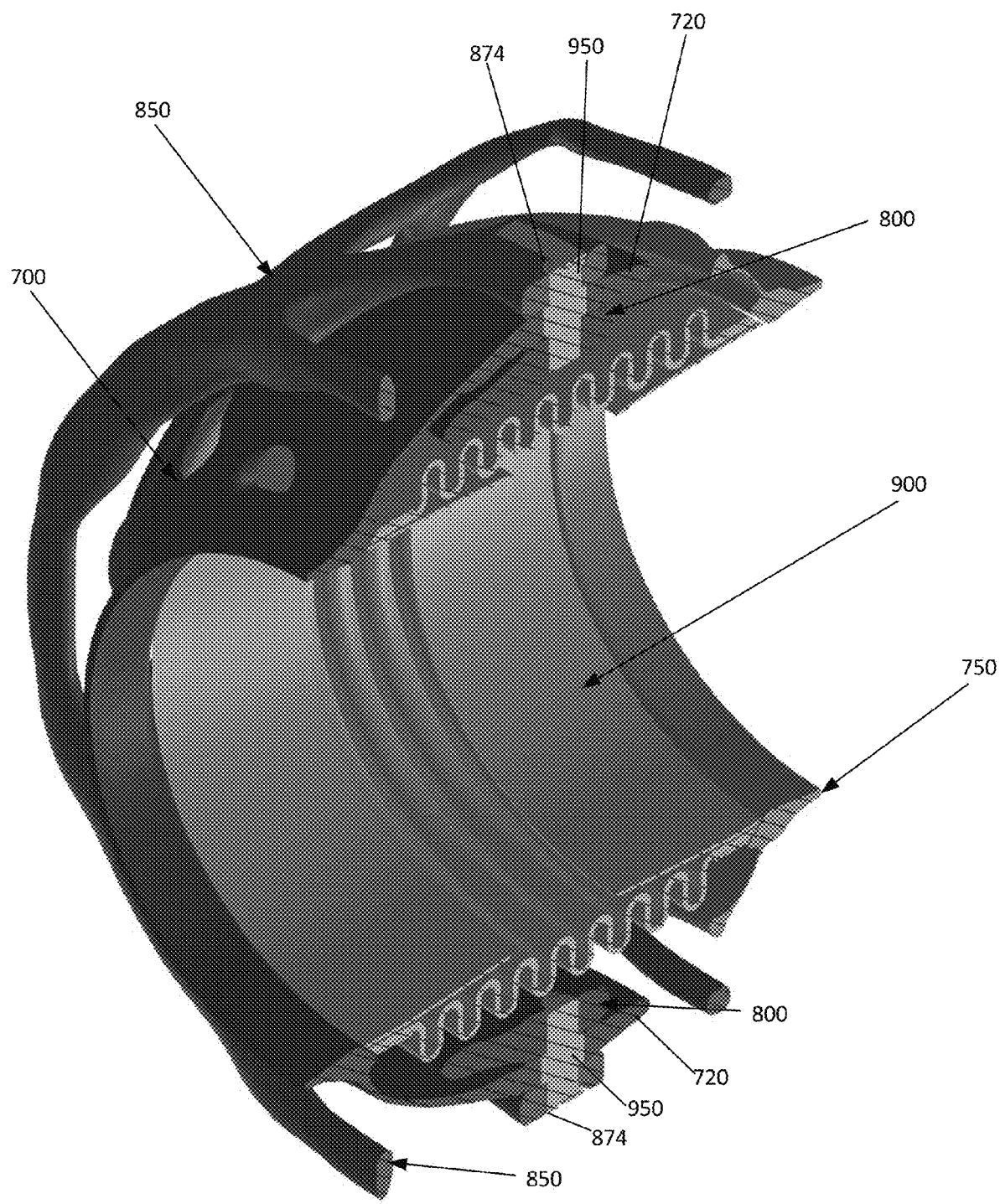
FIG. 20A is a cross-sectional perspective view of the example gimbal joint assembly, according to the embodiment of FIG. 19, taken along line 20A of FIG. 19 and looking in the direction of the arrows.

FIG. 20A is a cutaway perspective view, taken along line 20A in FIG. 19, showing multiple layered stacks formed by inner ring component 800, protrusion 720 of the first clevis 700, and outer ring component 850. The layered stack is shown on the relative top of the assembly, and on the relative bottom of the assembly. Connecting pin 950 is shown as passing through each layered stack. Furthermore, the bellows 900 are shown as providing a sealed conduit across first clevis 700 and second clevis.

Figure 20B:
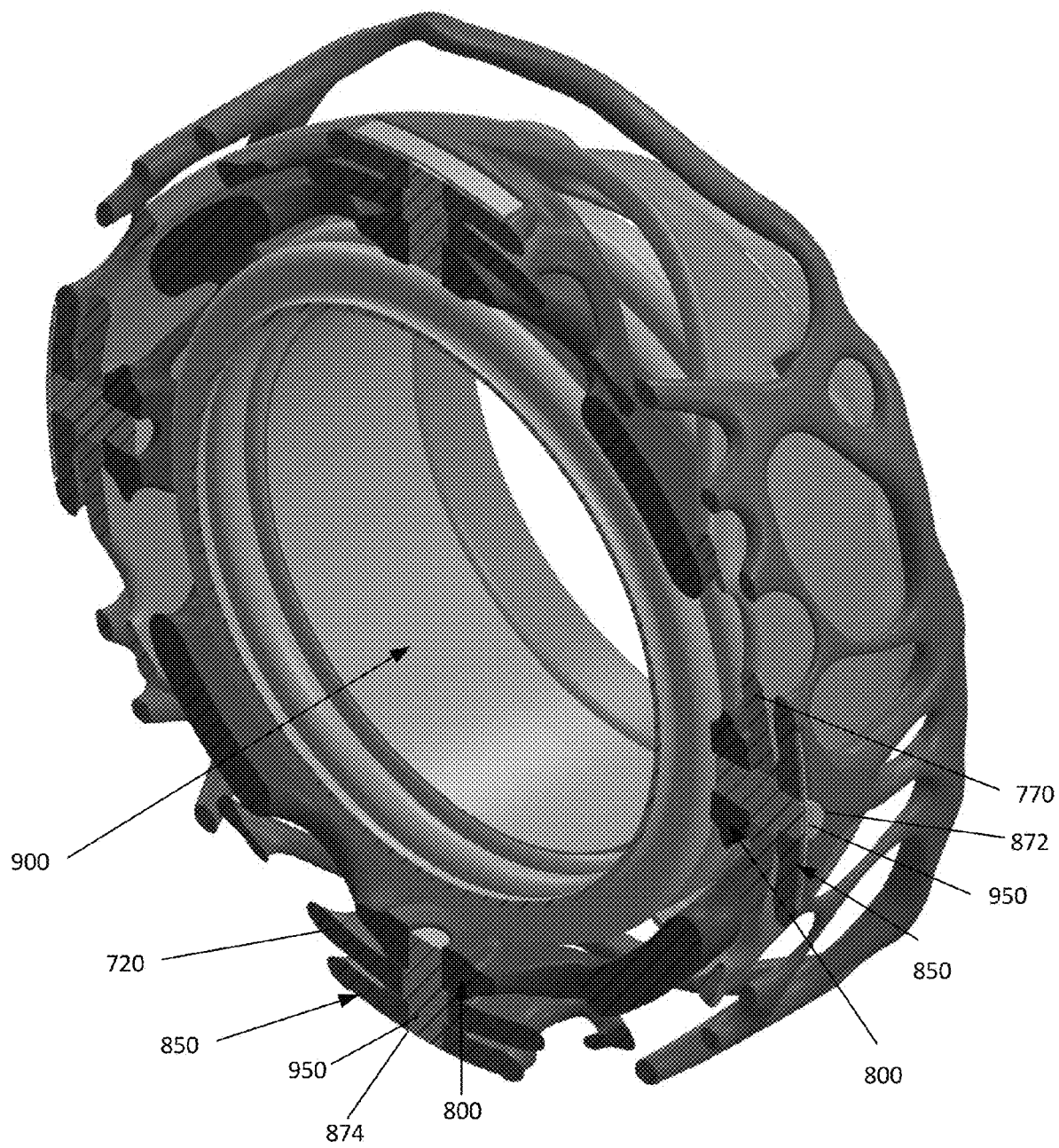
FIG. 20B is a cross-sectional perspective view of the example gimbal joint assembly, according to the embodiment of FIG. 19, taken along lines 20B of FIG. 19 and looking in the direction of the arrows.

FIG. 20B is a cutaway perspective view, taken along line 20B in FIG. 19, showing multiple layered stacks formed by various components. As shown in FIG. 20B, two of the layered stacks, which are located at the relative top and the relative bottom of the view, are each formed by inner ring component 800, protrusion 720 of first clevis 700, and outer ring component 850. The other two of the layered stacks, which are located at the relative left and the relative right of the view, are each formed by inner ring 800, protrusion 770 of second clevis 750, and outer ring 850. Connecting pin 950 is shown to pass through all four of the layered stacks.

Figure 21:
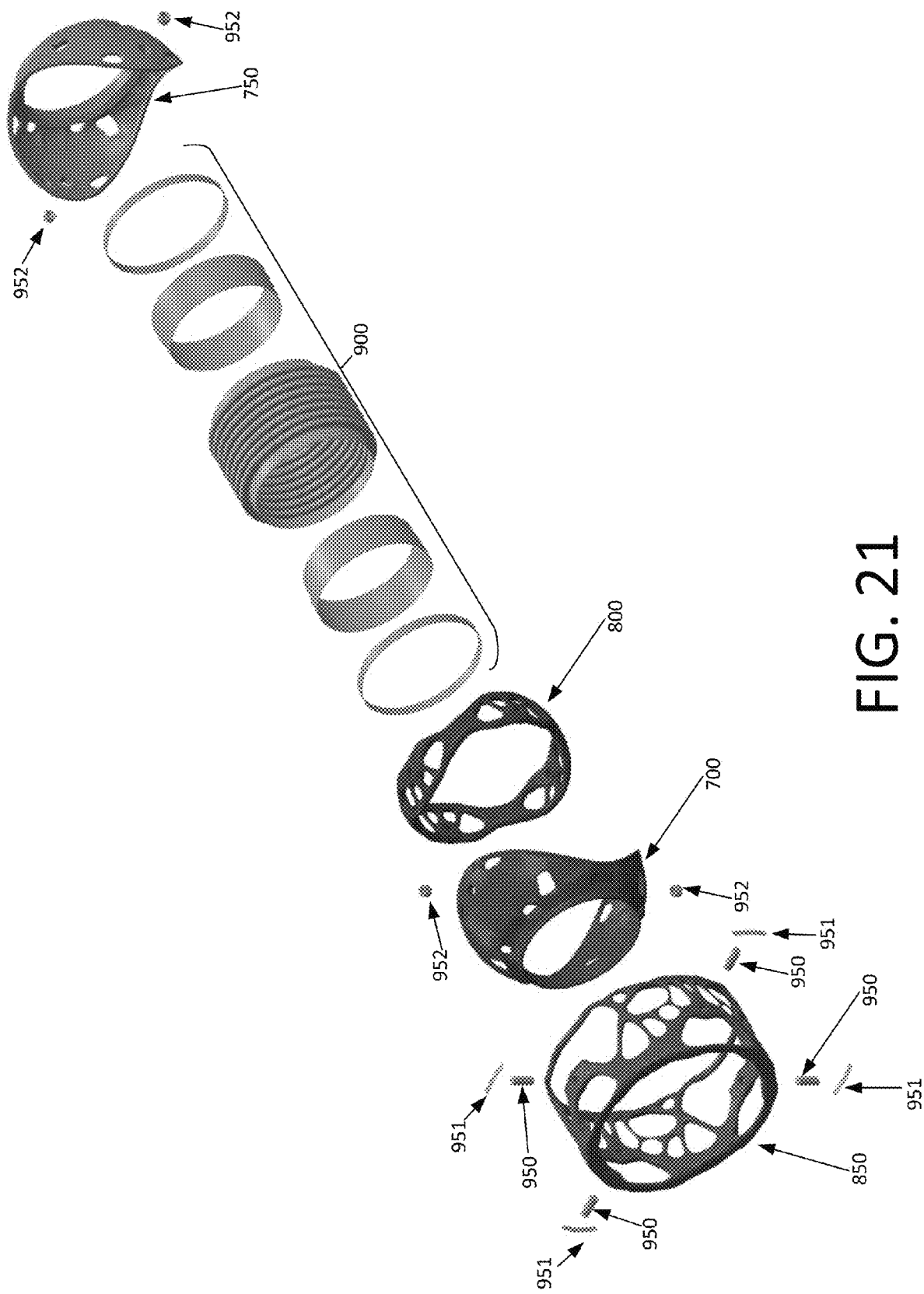
FIG. 21 is an exploded perspective view of the example gimbal joint assembly, according to the embodiment of FIG. 19.

FIG. 21 is depicts the gimbal joint assembly shown in FIG. 19 in an exploded perspective view. As shown in FIG. 21, bellows 900 may be concentrically positioned within inner ring 800. Clevises 700 and 750 are positioned on opposite ends of bellows 900 and fit around inner ring 800 and bellows 900. Bushings 952 are placed about the bores of first clevis 700 and second clevis 750. Outer ring 850 then fits around the remaining components. Pins 950 may be inserted through aligned bore holes of first clevis 700, second clevis 750, inner ring 800, and outer ring 850 respectively. Pins 950 may, in some implementations, be held in place by covers 951. In other implementations, the pins 950 may be welded, brazed, or otherwise secured in place.

As described above, aspects of the gimbal joint design may be parametrically generated and/or optimized according to a set of engineering requirements, design constraints, and other considerations. An example technique involves parameterizing aspects of a gimbal joint's design, such as the shape and size of the clevises, clevis lobes, and gimbal ring, the thickness of the material at various locations about the clevises and/or gimbal ring, and the dimensions of any struts, trusses, or shear web structures formed within the clevises and/or gimbal ring, among other aspects. The parameterized gimbal joint design may thereby serve as a model, which serves as a basis for computationally generating particular implementations of the parameterized model.

Generating a gimbal joint design may, in some embodiments, involve two stages of optimization. First, a set of design constraints and requirements (e.g., space constraints, the overall dimensions or size of the gimbal joint assembly, etc.) may be provided as parameters into a geometric optimizer. The geometric optimizer may perform a geometric optimization (e.g., shape and size optimizations) to determine a shape that satisfies the design constraints in view of one or more cost functions (e.g., component collisions or space between adjacent elements, total volume of material, the use of preferred shapes over other lesser-preferred shapes, etc.). The output of the geometric optimizer may provide a rough, space-constrained version of a gimbal joint design that may not be topologically optimized, and may exhibit features that are difficult to manufacture.

Geometric optimization techniques may also be used to augment or enhance engineering judgment. In developing an initial design of a component part, it remains commonplace for engineers to rely on their own judgment—which often involves some amount of trial-and-error and educated guesswork. Thus, it is often the case that an engineer or designer does not know with certainty whether or not a particular geometry would provide a suitable amount of structural compliance, maintain sufficient clearance with other adjacent components in an assembly, or otherwise be a feasible basis for a component's design. As a result, an engineer may waste a substantial amount of time and resources developing an initial design that is later determined to be unsuitable, impractical, or incompatible within an assembly.

By parameterizing aspects of a component's design and encoding them into a geometric optimizer or evaluator, according to the principles disclosed in the present application, an engineer may receive near real-time feedback on proposed component designs. Mathematically, a geometric optimizer might attempt to determine whether or not a solution exists to a system of equations (which define the constraints and boundaries for a given component), given one or more input parameter values. If the optimizer cannot find a solution for those input values that does not violate any boundaries, or otherwise unacceptably exceeds the constraints, then the optimizer might inform the engineer that no suitable designs exist for that input set of parameter values. Conversely, if the optimizer determines that one or more suitable solutions exist for the set of input values, then the optimizer may inform the engineer that the one or more suitable solutions exist. Such a geometric optimizer substantially reduces the amount of time involved in developing a component's initial design.

In addition, a geometric optimizer or evaluator may determine that one or more features or elements of a component are extraneous, dispensable, or otherwise can be omitted. For example, the geometric optimizer may determine that a clearance, material shape, void shape, and/or other elements can be removed, while still satisfying one or more structural requirements. In this manner, the geometric optimizer may further augment an engineer's design workflow, by indicating features of a given component's geometry that are unnecessary—expediting the design process, and avoiding the otherwise costly endeavor of constructing and testing component parts that are later discovered to be unsuitable.

In some cases, one or more constraints or limitations may be omitted from the geometric optimization process. For example, the components of an interlocking gimbal joint assembly, such as the embodiment shown and described with respect to FIGS. 8-14F, may be formed using additive manufacturing in a partially-assembled state. In such cases, determining whether two separate components can be assembled (e.g., whether sufficient clearance exists to permit one component to be arranged within, about, or otherwise together with) may be extraneous. Thus, for some assembly designs, topological optimization may precede geometric optimization.

Second, an additional set of constraints (e.g., features that cannot be manufactured, spaces beyond which a component cannot extend, etc.), boundary conditions (e.g., limitations of a particular manufacturing method, such as the resolution of an additive manufacturing machine or other support structures required for a particular additive manufacturing process), a particular range of loads or other engineering requirements (e.g., temperatures, pressures, shear stresses, compressive stresses, tensile stresses, bend angles, etc.), and other factors that may limit or affect the design and operation of the gimbal joint may be provided as parameters into a topological optimizer. The topological optimizer may serve to optimize the material layout and distribution within the constrained design space determined by the geometric optimizer.

The topological optimizer may, for example, attempt to determine a topology as a connected sum or two or more topological spaces or manifolds. For example, the lobes shown in the embodiments FIGS. 1A-7B include five smooth gaps or apertures in which dispensable material is omitted. Topologically, the lobe may be considered a connected sum of adjoining tori, with each torus corresponding to a gap in the lobe. More particularly, the lobe may be considered a "genus-five" surface comprised of five "glued" or attached tori. An example optimization technique may involve geometrically determining that a five tori shape satisfies a set of set of design requirements, and subsequently optimizing the shape of the lobe topologically in a way that reduces or minimizes the amount of remaining material, renders the design manufacturable in view of limitations on the manufacturing process or machine, and/or otherwise refining the shape of the lobe to increase the structural integrity of the shear web.

In this manner, the design of gimbal joint components may be generated, optimized, or otherwise refined. In some instances, designs for the components of the gimbal joint may be initially designed by an engineer (e.g., using computer aided design (CAD) software), which is subsequently refined or optimized geometrically and/or topologically. In other cases, an engineer may develop the parameterized model (e.g., as a system of parameterized equations that include objective functions, constraint functions, design spaces, a predetermined shape or set of shapes, etc.), which may serve as the basis for generating a design that is complaint with a particular set of requirements and engineering specifications. The particular parameters, shapes, topologies, and considerations in developing a parameterized model, a geometric optimizer, and/or a topological optimizer may vary, depending on the particular application for the gimbal joint (e.g., automotive systems, aircraft systems, aerospace systems, etc.).

Although certain example methods and apparatus have been described herein, the scope of coverage of this patent is not limited thereto. On the contrary, this patent covers all methods, apparatuses, and articles of manufacture fairly falling within the scope of the appended claims, either literally or under the doctrine of equivalents.

It should be understood that arrangements described herein are for purposes of example only. As such, those skilled in the art will appreciate that other arrangements and other elements (e.g. machines, interfaces, operations, orders, and groupings of operations, etc.) can be used instead, and that some elements may be omitted altogether, according to the desired results. Further, many of the elements that are described are functional entities that may be implemented as discrete or distributed components or in conjunction with other components, in any suitable combination and location, or as other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A sealed joint assembly for transmitting high temperature and high pressure fluid between adjoining ducts, the joint assembly comprising:

a gimbal ring comprising at least two separate gimbal ring components, said gimbal ring components comprising:
- at least one outer gimbal ring, having a first set of bores circumferentially spaced about the outer gimbal ring; and
- at least one inner gimbal ring, having a second set of bores circumferentially spaced about the inner gimbal ring;

at least one first clevis comprising a first annular shroud adapted for positioning concentrically within a portion of the outer gimbal ring, said first annular shroud having a distal end, and at least two protrusions integrally formed with the first annular shroud, each protrusion extending and protruding axially away from the distal end, and each protrusion having a bore extending therethrough for alignment with a respective bore of the first set of bores in the outer gimbal ring and a respective bore of the second set of bores in the inner gimbal ring, said first clevis adapted to sealedly couple with a duct conveying high temperature and high pressure fluid;

at least one second clevis comprising a second annular shroud adapted for positioning concentrically within a portion of the outer gimbal ring, said second annular shroud having a proximal end, and at least two protrusions extending and protruding axially away from the proximal end, and each protrusion having a bore extending therethrough for alignment with a respective bore of the first set of bores in the outer gimbal ring and a respective bore of the second set of bores in the inner gimbal ring, said second clevis adapted to sealedly couple with a duct conveying high temperature and high pressure fluid; and a bellows having a first end and a second end, said first end being sealedly coupled to the first clevis, and said second end being sealedly coupled to the second clevis, in which at least one of the outer gimbal ring, the inner gimbal ring, the first clevis, and the second clevis is formed using geometrical and structural optimization, and in which said inner gimbal ring is positioned concentrically within the first clevis and the second clevis, and in which said outer gimbal ring is positioned concentrically about the first clevis and the second clevis.

2. The joint assembly according to claim 1, in which the outer gimbal ring comprises one or more struts extending circumferentially around a portion of the outer gimbal ring, and the inner gimbal ring comprises one or more struts extending circumferentially around a portion of the inner gimbal ring.

3. The joint assembly according to claim 2, in which the first clevis and the second clevis are substantially identical in shape and size.

4. The joint assembly according to claim 2, in which the outer gimbal ring and the inner gimbal ring have substantially similar stiffness properties.

5. The joint assembly according to claim 2, in which the one or more struts of the outer gimbal ring and the one or more struts of the inner gimbal ring are formed by the placement and omission of material via geometrical and structural optimization.

6. The joint assembly according to claim 5, in which the one or more struts of the outer gimbal ring and the one or more struts of the inner gimbal ring are formed by an additive manufacturing process.

7. The joint assembly according to claim 5, in which the one or more struts of the outer gimbal ring and the one or more struts of the inner gimbal ring are formed by at least one of machining and casting.

8. The joint assembly according to claim 2, in which the one or more struts of the outer gimbal ring and the one or more struts of the inner gimbal ring each form a shear web.

9. The joint assembly according to claim 2 in which at least one of the outer gimbal ring and the inner gimbal ring further includes one or more gaps formed by the omission of material via the additive manufacturing process, wherein such gaps are configured to achieve at least one of a reduction in mass and an increase in the stiffness of one or more of the outer gimbal ring and the inner gimbal ring.

10. The joint assembly according to claim 1, further comprising:
- a first pair of pins, each of the first pair of pins extending through a bore of the first set of bores in the outer gimbal ring, a bore of the second set of bores in the inner gimbal ring, and a respective bore of the first clevis, and
- a second pair of pins, each of the second pair of pins extending through a bore of the first set of bores in the outer gimbal ring, a bore of the second set of bores in the inner gimbal ring, and a respective bore of the second clevis.

11. The joint assembly according to claim 1, in which at least one of the outer gimbal ring and the inner gimbal ring is constructed using additive manufacturing.

12. The joint assembly according to claim 1, in which at least one of the first clevis and the second clevis is constructed using additive manufacturing.

13. The joint assembly according to claim 1, in which at least one of the first clevis and the second clevis has an optimized geometry that is computationally generated based on one or more dimensional constraints.

14. The joint assembly according to claim 1, in which at least one of the outer gimbal ring and the inner gimbal ring has an optimized geometry that is computationally generated based on one or more dimensional constraints.

15. The joint assembly according to claim 1, in which at least one of the first clevis and the second clevis has an optimized topology that is computationally generated based on one or more load specifications.

16. The joint assembly according to claim 1, in which at least one of the outer gimbal ring and the inner gimbal ring has an optimized topology that is computationally generated based on one or more load specifications.

17. A sealed joint assembly for providing a channel for media, the joint assembly comprising:
a gimbal ring comprising at least two separate gimbal ring components, said gimbal ring components comprising:
- at least one outer gimbal ring, having a first set of bores circumferentially spaced about the outer gimbal ring; and
- at least one inner gimbal ring, having a second set of bores circumferentially spaced about the inner gimbal ring;

at least one first clevis comprising a first annular shroud adapted for positioning concentrically within a portion of the outer gimbal ring, said first annular shroud having a distal end, and at least two protrusions integrally formed with the first annular shroud, each protrusion extending and protruding axially away from the distal end, and each protrusion having a bore extending therethrough for alignment with a respective bore of the first set of bores in the outer gimbal ring and a respective bore of the second set of bores in the inner gimbal ring; and at least one second clevis comprising a second annular shroud adapted for positioning concentrically within a portion of the outer gimbal ring, said second annular shroud having a proximal end, and at least two protrusions extending and protruding axially away from the proximal end, and each protrusion having a bore extending therethrough for alignment with a respective bore of the first set of bores in the outer gimbal ring and a respective bore of the second set of bores in the inner gimbal ring, in which at least one of the outer gimbal ring, the inner gimbal ring, the first clevis, and the second clevis is formed using geometrical and structural optimization, and in which said inner gimbal ring is positioned concentrically within the first clevis and the second clevis, and in which said outer gimbal ring is positioned concentrically about the first clevis and the second clevis.

18. The joint assembly according to claim 17, in which the outer gimbal ring comprises one or more struts extending circumferentially around a portion of the outer gimbal ring, and the inner gimbal ring comprises one or more struts extending circumferentially around a portion of the inner gimbal ring.

19. The joint assembly according to claim 17, in which the outer gimbal ring and the inner gimbal ring have substantially similar stiffness properties.

20. A method of manufacturing a sealed gimbal joint for transmitting high temperature and high pressure fluid between adjoining ducts, the method comprising:

forming a gimbal ring comprised of at least two separate gimbal ring components, the gimbal ring components comprised of an outer gimbal ring having a first set of bores circumferentially spaced thereabout and an inner gimbal ring having a second set of bores circumferentially spaced thereabout;

forming at least one first clevis that includes a first annular shroud adapted for positioning concentrically within a portion of the outer gimbal ring, said first annular shroud having a distal end, and at least two protrusions integrally formed with the first annular shroud, each protrusion extending and protruding axially away from the distal end, and each protrusion having a bore extending therethrough for alignment with a respective bore of the first set of bores in the outer gimbal ring and a respective bore of the second set of bores in the inner gimbal ring, said first clevis adapted to sealedly couple with a duct conveying high temperature and high pressure fluid;

forming at least one second clevis that includes a second annular shroud adapted for positioning concentrically within a portion of the outer gimbal ring, said second annular shroud having a proximal end, and at least two protrusions extending and protruding axially away from the proximal end, and each protrusion having a bore extending therethrough for alignment with a respective bore of the first set of bores in the outer gimbal ring and a respective bore of the second set of bores in the inner gimbal ring, said second clevis adapted to sealedly couple with a duct conveying high temperature and high pressure fluid; and sealedly coupling a first end of a bellows to the first clevis and a second end of the bellows to the second clevis, in which at least one of the outer gimbal ring, the first clevis, and the second clevis is formed using geometrical and structural optimization, and in which said inner gimbal ring is positioned concentrically within the first clevis and the second clevis, and in which said outer gimbal ring is positioned concentrically about the first clevis and the second clevis.

21. The method according to claim 20, further comprising:

aligning each of the bores of the at least two protrusions of the first clevis with a first pair of bores from the first set of bores and a second pair of bores from the second set of bores;

aligning each of the bores of the at least two protrusions of the second clevis with a third pair of bores from the first set of bores and a fourth pair of bores from the second set of bores; and inserting a set of pins through each respective aligned pair of bores, to rigidly couple the first and second clevises to the first and second gimbal rings.

22. The method according to claim 20, in which the steps of forming the outer gimbal ring, the inner gimbal ring, the first clevis and the second clevis further comprise at least one of:

forming at least one of the outer gimbal ring, the inner gimbal ring, the first clevis and the second clevis by the further step of additive manufacturing;

forming at least one of the outer gimbal ring, the inner gimbal ring, the first clevis and the second clevis by the further step of machining; and forming at least one of the outer gimbal ring, the inner gimbal ring, the first clevis and the second clevis by the further step of casting.

23. A sealed joint assembly for transmitting high temperature and high pressure fluid between adjoining ducts, the joint assembly comprising:

a gimbal ring, said gimbal ring comprising:
at least one outer gimbal ring, having a first set of bores circumferentially spaced about the outer gimbal ring; and
at least one inner gimbal ring, having a second set of bores circumferentially spaced about the inner gimbal ring;

at least one first clevis comprising a first annular shroud adapted for positioning concentrically within a portion of the outer gimbal ring, said first annular shroud having a distal end, and at least two protrusions integrally formed with the first annular shroud, each protrusion extending and protruding axially away from the distal end, and each protrusion having a bore extending therethrough for alignment with a respective bore of the first set of bores in the outer gimbal ring and a respective bore of the second set of bores in the inner gimbal ring, said first clevis adapted to sealedly couple with a duct conveying high temperature and high pressure fluid;

at least one second clevis comprising a second annular shroud adapted for positioning concentrically within a portion of the outer gimbal ring, said second annular shroud having a proximal end, and at least two protrusions extending and protruding axially away from the proximal end, and each protrusion having a bore extending therethrough for alignment with a respective bore of the first set of bores in the outer gimbal ring and a respective bore of the second set of bores in the inner gimbal ring, said second clevis adapted to sealedly couple with a duct conveying high temperature and high pressure fluid; and a bellows having a first end and a second end, said first end being sealedly coupled to the first clevis, and said second end being sealedly coupled to the second clevis, in which at least one of the outer gimbal ring, the inner gimbal ring, the first clevis, and the second clevis is formed using geometrical and structural optimization, and in which the outer gimbal ring comprises one or more struts extending circumferentially around a portion of the outer gimbal ring, and the inner gimbal ring comprises one or more struts extending circumferentially around a portion of the inner gimbal ring.

24. The joint assembly according to claim 23, in which the first clevis and the second clevis are substantially identical in shape and size.

25. The joint assembly according to claim 23, in which the outer gimbal ring and the inner gimbal ring have substantially similar stiffness properties.

26. The joint assembly according to claim 23, in which the one or more struts of the outer gimbal ring and the one or more struts of the inner gimbal ring are formed by the placement and omission of material via geometrical and structural optimization.

27. The joint assembly according to claim 26, in which the one or more struts of the outer gimbal ring and the one or more struts of the inner gimbal ring are formed by an additive manufacturing process.

28. The joint assembly according to claim 26, in which the one or more struts of the outer gimbal ring and the one or more struts of the inner gimbal ring are formed by at least one of machining and casting.

29. The joint assembly according to claim 23, in which the one or more struts of the outer gimbal ring and the one or more struts of the inner gimbal ring each form a shear web.

30. The joint assembly according to claim 23, in which at least one of the outer gimbal ring and the inner gimbal ring further includes one or more gaps formed by the omission of material via the additive manufacturing process, wherein such gaps are configured to achieve at least one of a reduction in mass and an increase in the stiffness of one or more of the outer gimbal ring and the inner gimbal ring.

31. A sealed joint assembly for providing a channel for media, the joint assembly comprising:

a gimbal ring, said gimbal ring comprising:

at least one outer gimbal ring, having a first set of bores circumferentially spaced about the outer gimbal ring; and at least one inner gimbal ring, having a second set of bores circumferentially spaced about the inner gimbal ring;

at least one first clevis comprising a first annular shroud adapted for positioning concentrically within a portion of the outer gimbal ring, said first annular shroud having a distal end, and at least two protrusions integrally formed with the first annular shroud, each protrusion extending and protruding axially away from the distal end, and each protrusion having a bore extending therethrough for alignment with a respective bore of the first set of bores in the outer gimbal ring and a respective bore of the second set of bores in the inner gimbal ring; and at least one second clevis comprising a second annular shroud adapted for positioning concentrically within a portion of the outer gimbal ring, said second annular shroud having a proximal end, and at least two protrusions extending and protruding axially away from the proximal end, and each protrusion having a bore extending therethrough for alignment with a respective bore of the first set of bores in the outer gimbal ring and a respective bore of the second set of bores in the inner gimbal ring, in which at least one of the outer gimbal ring, the inner gimbal ring, the first clevis, and the second clevis is formed using geometrical and structural optimization, and in which the outer gimbal ring comprises one or more struts extending circumferentially around a portion of the outer gimbal ring, and the inner gimbal ring comprises one or more struts extending circumferentially around a portion of the inner gimbal ring.

* * * * *